United States Patent
Noguchi et al.

(10) Patent No.: US 9,261,683 B2
(45) Date of Patent: Feb. 16, 2016

(54) ZOOM LENS, IMAGING OPTICAL APPARATUS, AND DIGITAL DEVICE

(71) Applicant: KONICA MINOLTA, INC., Tokyo (JP)

(72) Inventors: Kazutaka Noguchi, Osakasayama (JP); Mamoru Terada, Sakai (JP); Daisuke Tanahashi, Osaka (JP); Hiroaki Tanaka, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/481,502

(22) Filed: Sep. 9, 2014

(65) Prior Publication Data

US 2015/0070534 A1 Mar. 12, 2015

(30) Foreign Application Priority Data

Sep. 11, 2013 (JP) ................. 2013-187968

(51) Int. Cl.

| | |
|---|---|
| *G02B 15/14* | (2006.01) |
| *G02B 9/34* | (2006.01) |
| *G02B 15/173* | (2006.01) |
| *G02B 13/00* | (2006.01) |
| *G02B 27/00* | (2006.01) |
| *G02B 5/00* | (2006.01) |

(52) U.S. Cl.
CPC .............. *G02B 15/173* (2013.01); *G02B 5/005* (2013.01); *G02B 9/34* (2013.01); *G02B 13/006* (2013.01); *G02B 13/009* (2013.01); *G02B 13/0045* (2013.01); *G02B 15/14* (2013.01); *G02B 27/0025* (2013.01); *G03B 2205/0046* (2013.01)

(58) Field of Classification Search
CPC .. G02B 15/14; G02B 13/009; G02B 13/0045; G02B 9/34; G02B 13/006; G02B 27/0025; G02B 5/005; G03B 2205/0046
USPC .................. 359/683–686, 740, 773
See application file for complete search history.

(56) References Cited

U.S. PATENT DOCUMENTS

| | | | |
|---|---|---|---|
| 5,633,759 | A | 5/1997 | Nagata et al. |
| 8,582,212 | B2 | 11/2013 | Ogata et al. |
| 2012/0019931 | A1* | 1/2012 | Ogata ............... G02B 13/04 359/684 |
| 2013/0033621 | A1 | 2/2013 | Maruyama |

FOREIGN PATENT DOCUMENTS

| | | |
|---|---|---|
| JP | 08-086962 A | 8/1996 |
| JP | 2012-027261 A | 2/2012 |
| JP | 2013-037105 A | 2/2013 |

\* cited by examiner

*Primary Examiner* — Evelyn A Lester
(74) *Attorney, Agent, or Firm* — Brinks Gilson & Lione

(57) ABSTRACT

A zoom lens includes, in an order from an object side, four groups of a positive group, a negative group, a positive group, and a negative group. For varying magnification from a wide-angle end to a telephoto end, the first group is configured to be moved toward the object side, the second group is configured to be moved toward an image side, the third group is configured to be moved toward the object side, and the fourth group is configured to be moved toward the object side, and conditional equations of $-0.63 < f2/f1 < -0.25$, $-10 < f2/y'max < -3$, and $6 < f1/y'max < 20$ (f1: the focal distance of the first group; f2: the focal distance of the second group; y'max: the maximum image height) are satisfied.

12 Claims, 23 Drawing Sheets

SPHERICAL ABERRATION (mm)

ASTIGMATISM (mm)

DISTORTION ABERRATION (%)

SPHERICAL ABERRATION (mm)

ASTIGMATISM (mm)

DISTORTION ABERRATION (%)

SPHERICAL ABERRATION (mm)

ASTIGMATISM (mm)

DISTORTION ABERRATION (%)

SPHERICAL ABERRATION (mm)

ASTIGMATISM (mm)

DISTORTION ABERRATION (%)

SPHERICAL ABERRATION (mm)

ASTIGMATISM (mm)

DISTORTION ABERRATION (%)

SPHERICAL ABERRATION (mm)

ASTIGMATISM (mm)

DISTORTION ABERRATION (%)

SPHERICAL ABERRATION (mm)

ASTIGMATISM (mm)

DISTORTION ABERRATION (%)

SPHERICAL ABERRATION (mm)

ASTIGMATISM (mm)

DISTORTION ABERRATION (%)

SPHERICAL ABERRATION (mm)

ASTIGMATISM (mm)

DISTORTION ABERRATION (%)

SPHERICAL ABERRATION (mm)

ASTIGMATISM (mm)

DISTORTION ABERRATION (%)

SPHERICAL ABERRATION (mm)

ASTIGMATISM (mm)

DISTORTION ABERRATION (%)

SPHERICAL ABERRATION (mm)

ASTIGMATISM (mm)

DISTORTION ABERRATION (%)

SPHERICAL ABERRATION (mm)

ASTIGMATISM (mm)

DISTORTION ABERRATION (%)

SPHERICAL ABERRATION (mm)

ASTIGMATISM (mm)

DISTORTION ABERRATION (%)

SPHERICAL ABERRATION (mm)

ASTIGMATISM (mm)

DISTORTION ABERRATION (%)

ZOOM LENS, IMAGING OPTICAL APPARATUS, AND DIGITAL DEVICE

The entire disclosure of Japanese Patent Application No. 2013-187968 filed on Sep. 11, 2013 including description, claims, drawings, and abstract are incorporated herein by reference in its entirety.

BACKGROUND OF THE INVENTION

1. Field of the Invention

Embodiments of the present invention relate to zoom lenses, imaging optical apparatuses, and digital devices. For example, the embodiments relate to, of imaging optical systems having variable power, a zoom lens that is optimal for a telephotographing system with a viewing angle (2ω) at a telephoto end of less than 15°. The embodiments also relate to an imaging optical apparatus that is configured to output a picture of a photographing subject captured by the zoom lens and an image sensor in the form of electrical signals, and a digital device with an image input function, such as a digital camera, installed with the imaging optical apparatus.

2. Description of the Related Art

JP 08-086962 A, JP 2012-027261 A, and JP 2013-037105 A have been proposed for a telephotographing zoom lens suitable for an imaging optical system.

Recently, demand for compact and lightweight lenses including an interchangeable lens has become stronger with respect to digital single lens reflex cameras, especially in the mirrorless field. Generally, of a zoom lens with a viewing angle at a telephoto end of less than 15°, the entire length tends to be longer. In addition, forcibly shortening the entire length involves increasing of the powers of lens groups, and this could magnify deterioration in performance due to manufacturing error.

The zoom lens described in JP 08-086962 A is not fully responsive to today's demand for compact and lightweight lenses. JP 2012-027261 A and JP 2013-037105 A disclose zoom lenses for a compact design. However, as a result of reduction in size, the powers of first and second groups are increased, which enhances deterioration in performance in case where the lens groups are decentered from the designed conditions.

SUMMARY OF THE INVENTION

Embodiments of the present invention have been made in view of the foregoing circumstances, and an object of the embodiments of the present invention is to provide a zoom lens, even with a viewing angle at a telephoto end of less than 15°, that is operable with favorable optical performance in the entire zoom range while being reduced in size and having higher produceability, as well as an imaging optical apparatus and a digital device that include the lens.

To achieve the above object, according to an aspect, a zoom lens reflecting one aspect of the present invention includes: a plurality of lens groups arranged at inter-group spacings along an optical axis between an object side and an image side, the zoom lens being configured such that magnification is varied by change of the inter-group spacings to be caused by movement of the lens groups along the optical axis, the lens groups including, in an order from the object side, a first group of positive power, a second group of negative power, a third group of positive power, and a fourth group of negative power, wherein for varying magnification from a wide-angle end to a telephoto end, the first group is configured to be moved toward the object side, the second group is configured to be moved toward the image side, the third group is configured to be moved toward the object side, and the fourth group is configured to be moved toward the object side, and the following conditional equations (1) to (3) are satisfied:

$$-0.63 < f2/f1 < -0.25 \quad (1);$$

$$-10 < f2/y'\text{max} < -3 \quad (2); \text{ and}$$

$$6 < f1/y'\text{max} < 20 \quad (3),$$

where f1 represents the focal distance of the first group,
f2 represents the focal distance of the second group, and
y'max represents the maximum image height.

In the zoom lens of Item. 1, where an inter-lens group spacing is an inter-lens spacing t satisfying a conditional equation (0):0.14<t/y'max of inter-lens spacings t in the third group, the third group preferably includes, from the order from the object side, a positive lens group, a negative lens group, and a positive lens group, and the following conditional equation (4) is satisfied:

$$-0.7 < f3n/f3 < -0.4 \quad (4),$$

where f3 represents the focal distance of the third group, and
f3n represents the focal distance of the negative lens group in the third group, the positive lens group on the object side in the third group preferably includes lenses from, calculation of t/y'max being performed in an order from a lens having the strongest negative power in the third group toward the object side, a first lens having an inter-lens spacing t with an adjacent lens of or larger than t/y'max=0.14 up to a lens closest to the object side in the third group, the negative lens group in the third group preferably includes a negative lens having the strongest power in the third group, and includes lenses from a lens that is next by one to the image side from, calculation of t/y'max being performed in the order from the negative lens toward the object side, a first lens having an inter-lens spacing t with an adjacent lens of or larger than t/y'max=0.14 up to a lens that is next by one to the object side from, calculation of t/y'max being performed in an order from the negative lens toward the image side, a first lens having an inter-lens spacing t with an adjacent lens of or larger than t/y'max=0.14, and the positive lens group on the image side in the third group preferably includes lenses from, calculation of t/y'max being performed in the order from the lens having the strongest negative power in the third group toward the image side, a first lens having an inter-lens spacing t with an adjacent lens of or larger than t/y'max=0.14 up to a lens closest to the image side in the third group.

In the zoom lens of Item. 1, where an inter-group spacing is an inter-lens spacing t satisfying a conditional equation (0): 0.14<t/y'max of inter-lens spacings t in the second group, the second group preferably includes, from the order from the object side, a negative group and a positive group, the positive group having at least one cemented lens.

In the zoom lens of Item. 3, the negative group of the second group preferably includes a negative meniscus lens having a convex surface as a surface on the object side, and the positive group of the second group preferably includes a lens having a convex surface as a surface on the object side and a lens having a concave surface as a surface on the image side.

In the zoom lens of Item. 1, for focusing from the infinity to a proximate object, the fourth group is preferably configured to be moved toward the image side along the optical axis.

In the zoom lens of Item. 1, the fourth group preferably has at least a positive lens and a negative lens.

In the zoom lens of Item. 1, any one of the positive lens groups in the third group preferably has at least two positive lenses.

According to another aspect, an imaging optical apparatus reflecting one aspect of the present invention includes:

the zoom lens of Item. 1; and an image sensor having a photoreceiving surface, the image sensor being configured to convert an optical image formed on the photoreceiving surface into electrical signals, wherein the zoom lens is arranged such that an optical image of a photographing subject is adapted to be formed on the photoreceiving surface of the image sensor.

According to another aspect, a digital device reflecting one aspect of the present invention includes the imaging optical apparatus of Item. 8, the imaging optical apparatus providing at least one function of still image photographing or moving picture shooting of a photographing subject.

BRIEF DESCRIPTION OF THE DRAWINGS

The above and other objects, advantages and features of the present invention will become more fully understood from the detailed description given hereinbelow and the appended drawings which are given byway of illustration only, and thus are not intended as a definition of the limits of the present invention, and wherein.

DESCRIPTION OF THE PREFERRED EMBODIMENTS

Figure 1:
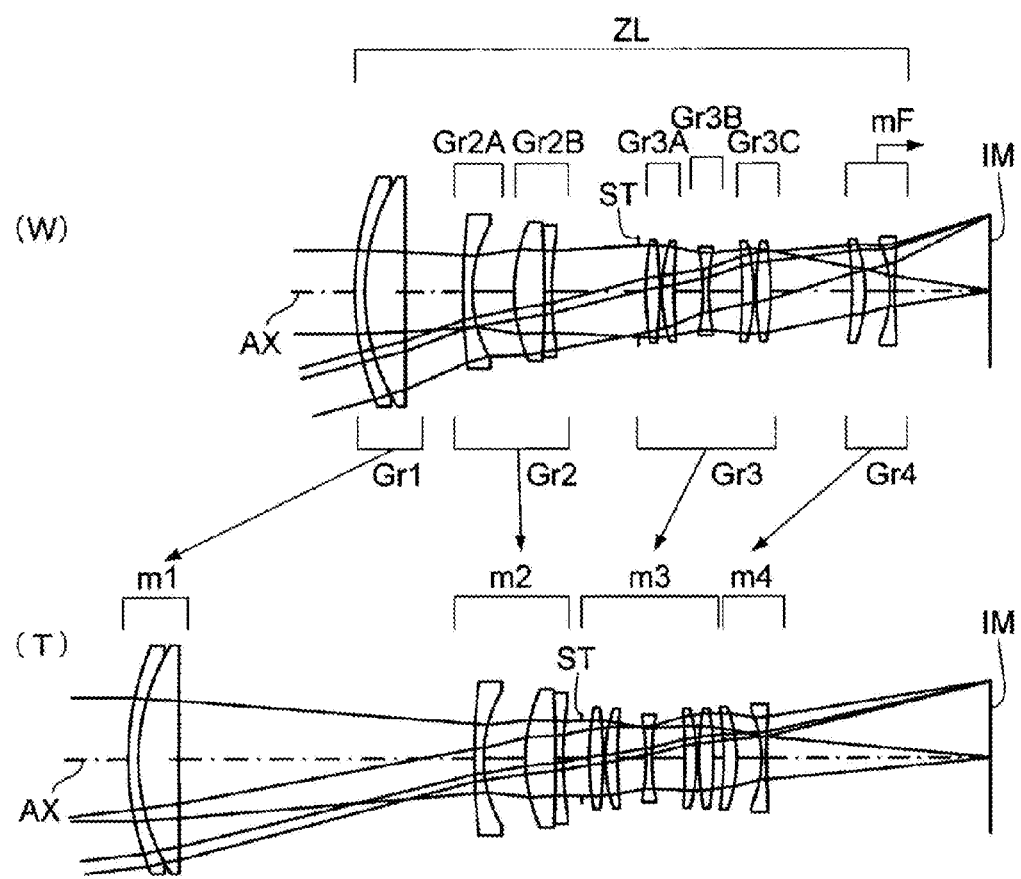
FIG. 1 is an optical composition diagram of a first embodiment (Example 1)
Figure 2:
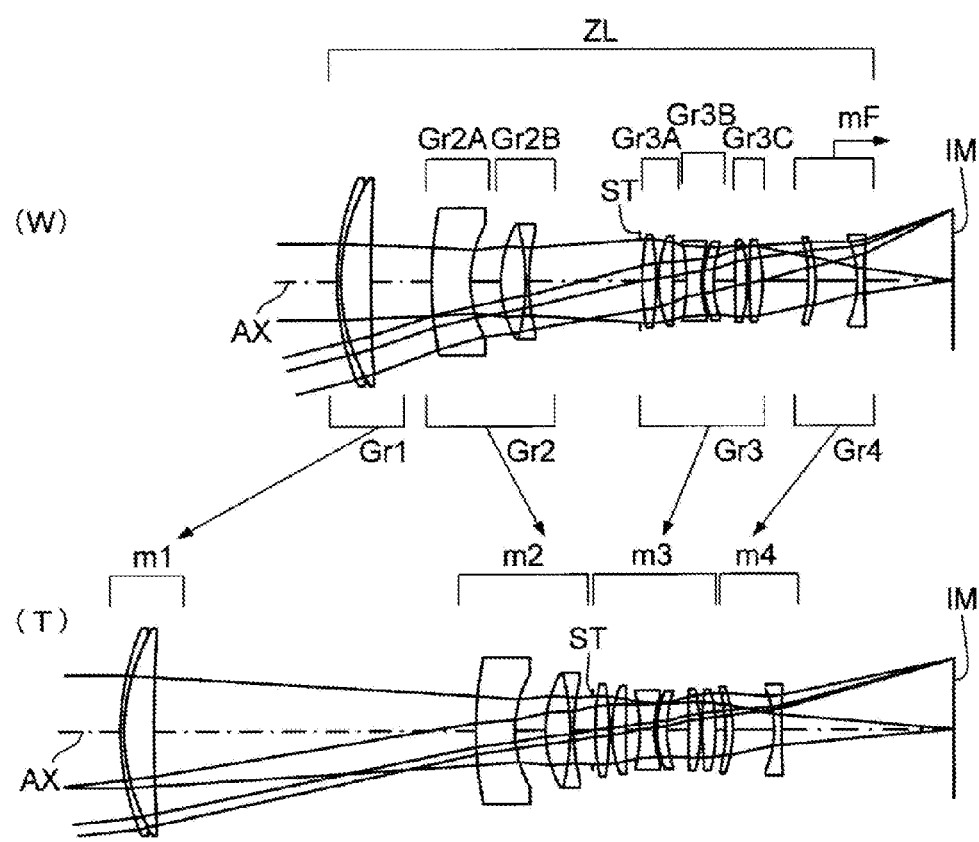
FIG. 2 is an optical composition diagram of a second embodiment (Example 2)
Figure 3:
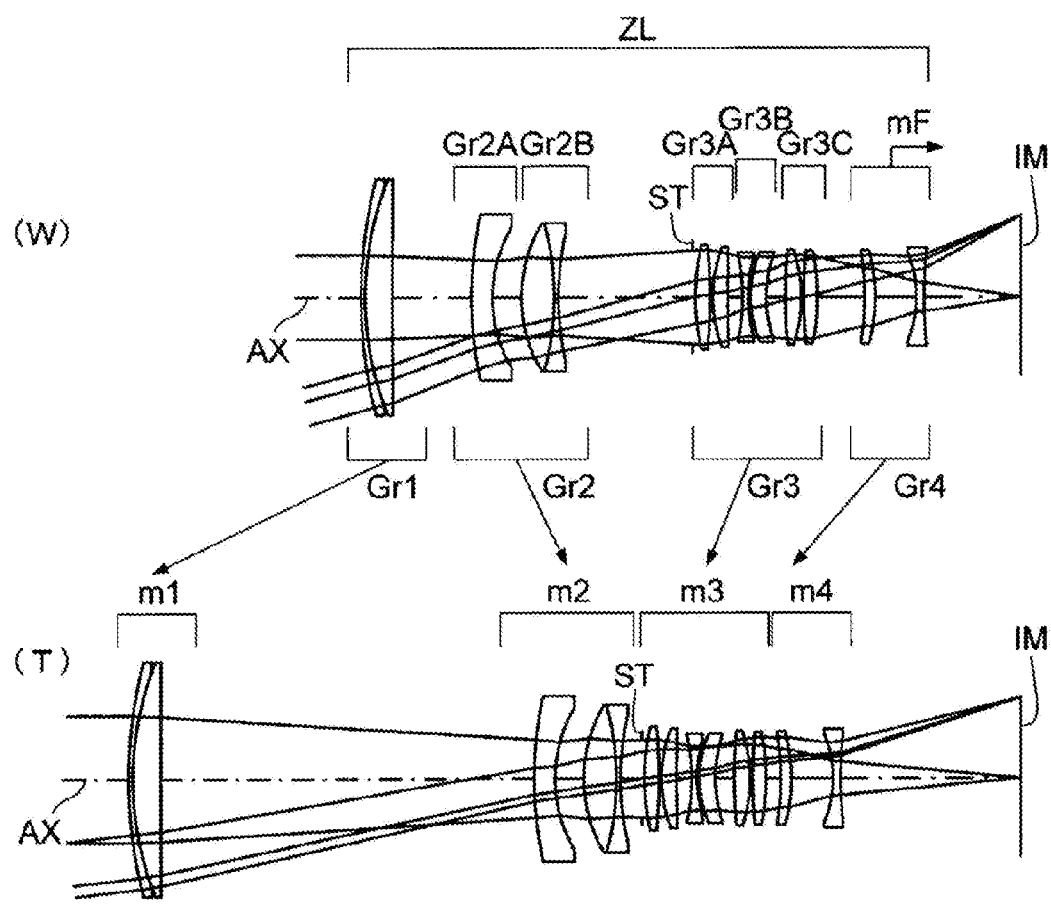
FIG. 3 is an optical composition diagram of a third embodiment (Example 3)
Figure 4:
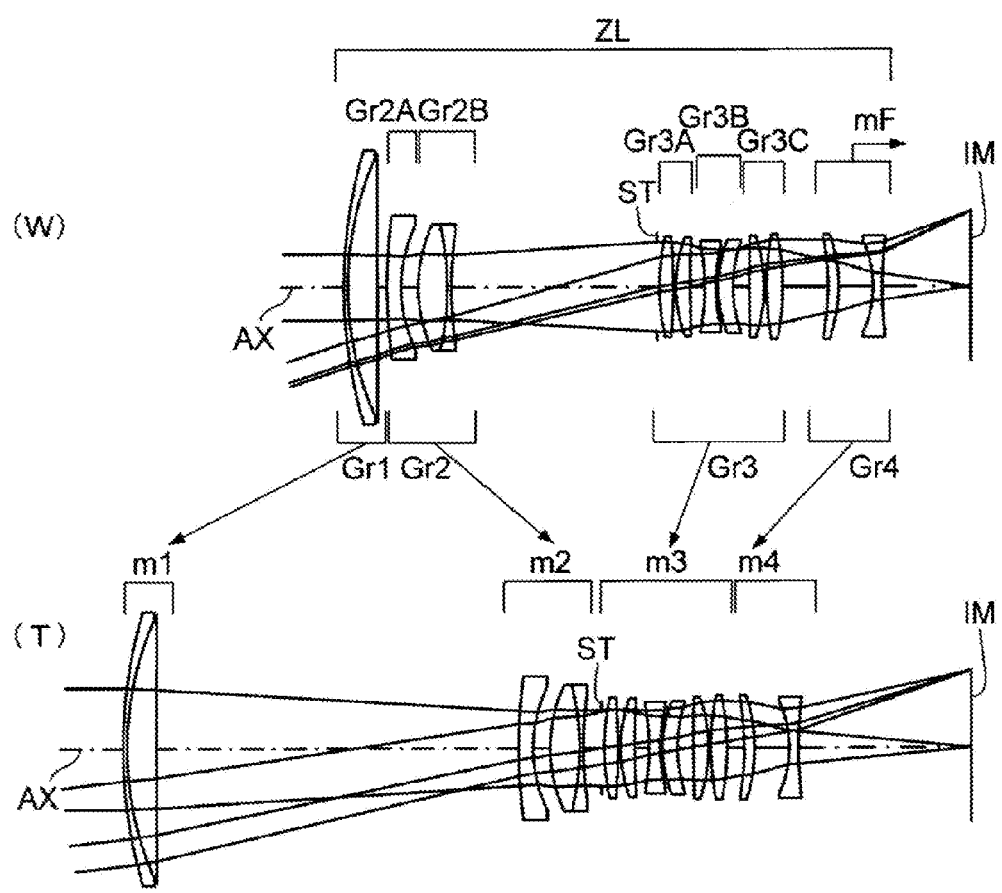
FIG. 4 is an optical composition diagram of a fourth embodiment (Example 4)
Figure 5:
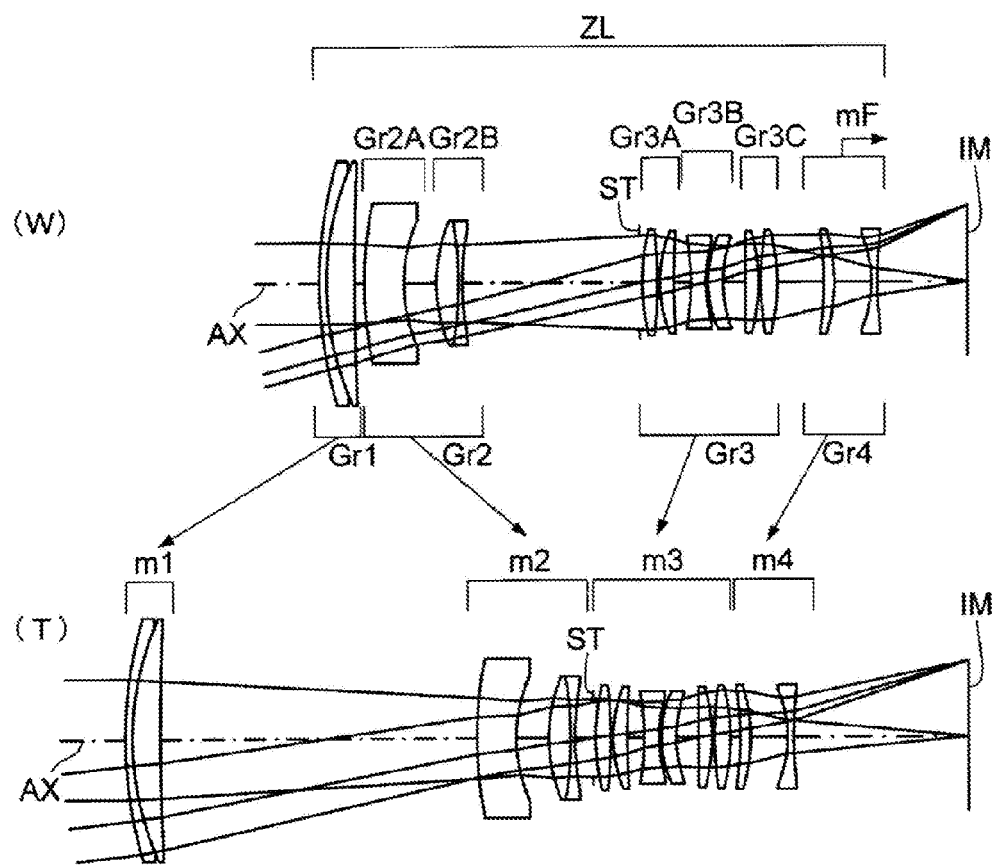
FIG. 5 is an optical composition diagram of a fifth embodiment (Example 5)
Figure 6:
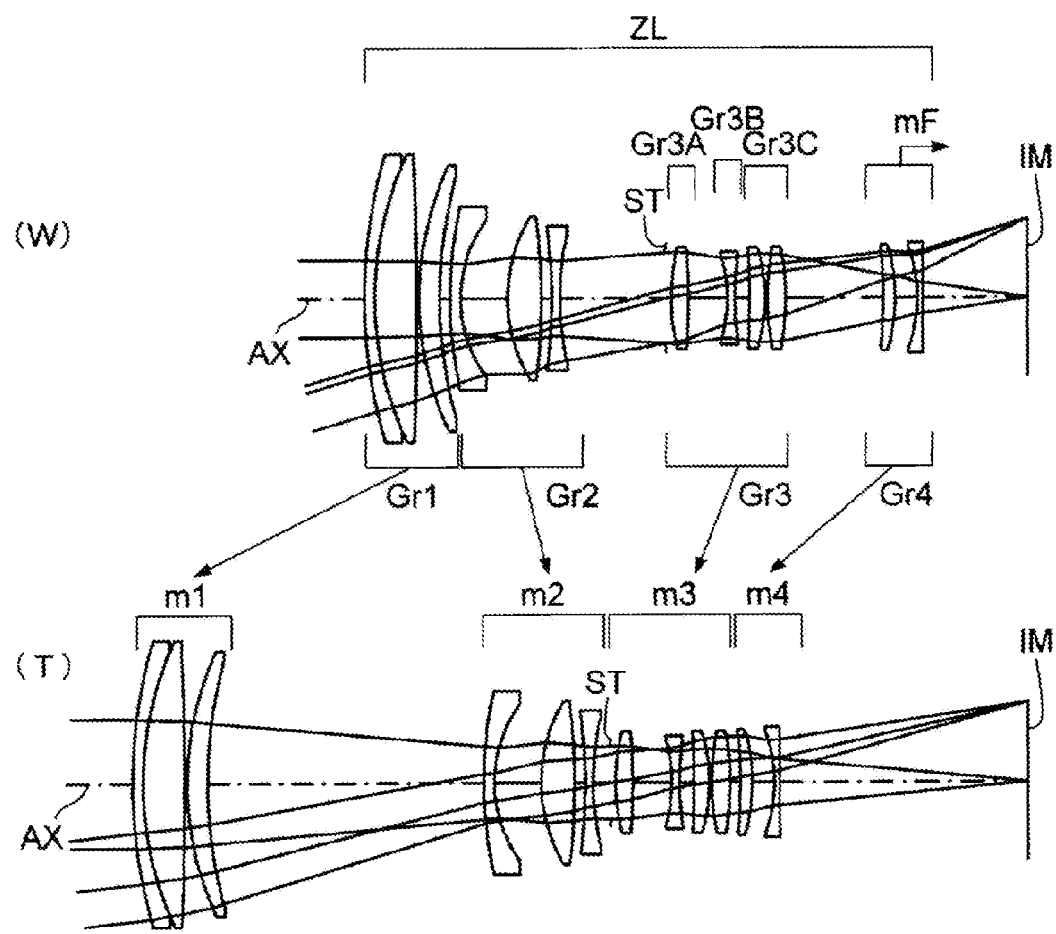
FIG. 6 is an optical composition diagram of a sixth embodiment (Example 6)
Figure 7:
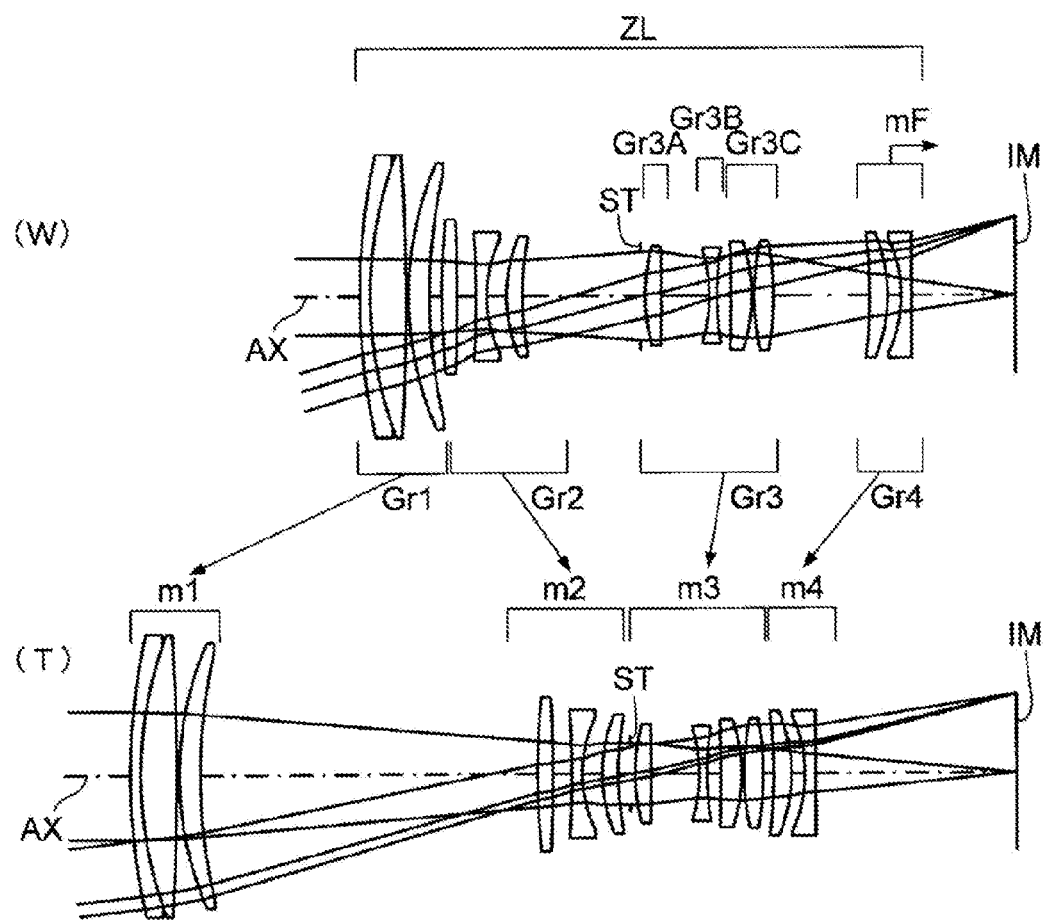
FIG. 7 is an optical composition diagram of a seventh embodiment (Example 7)
Figure 8:
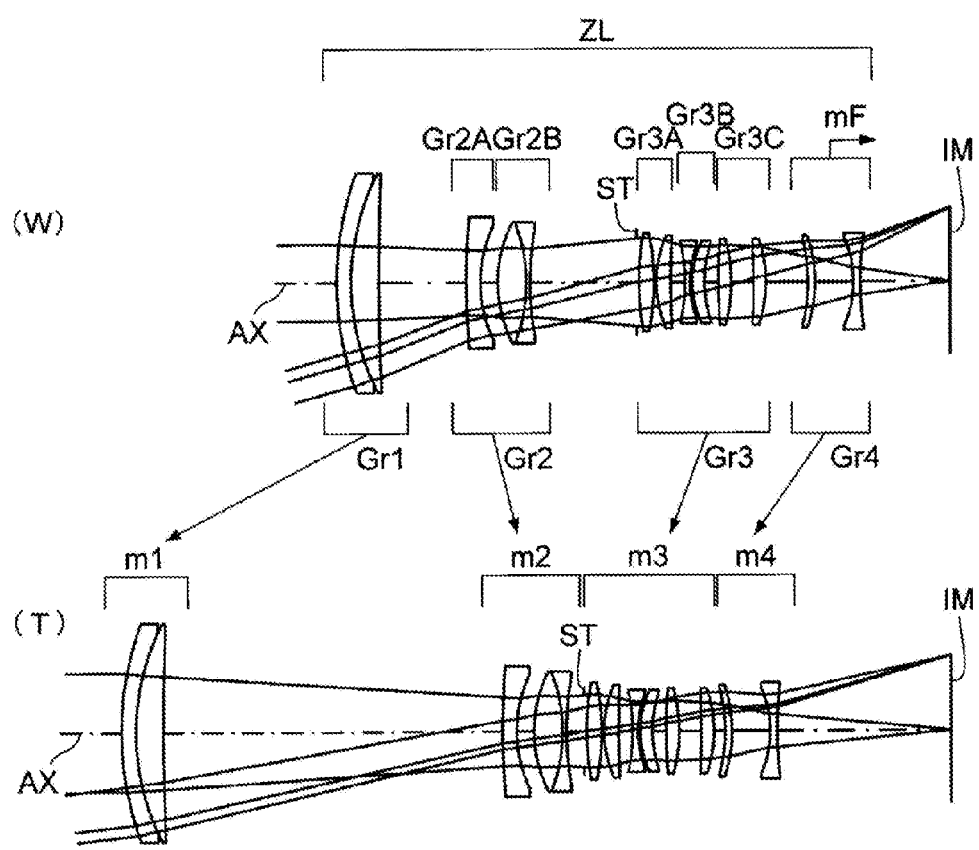
FIG. 8 is an optical composition diagram of an eighth embodiment (Example 8)
Figure 9:
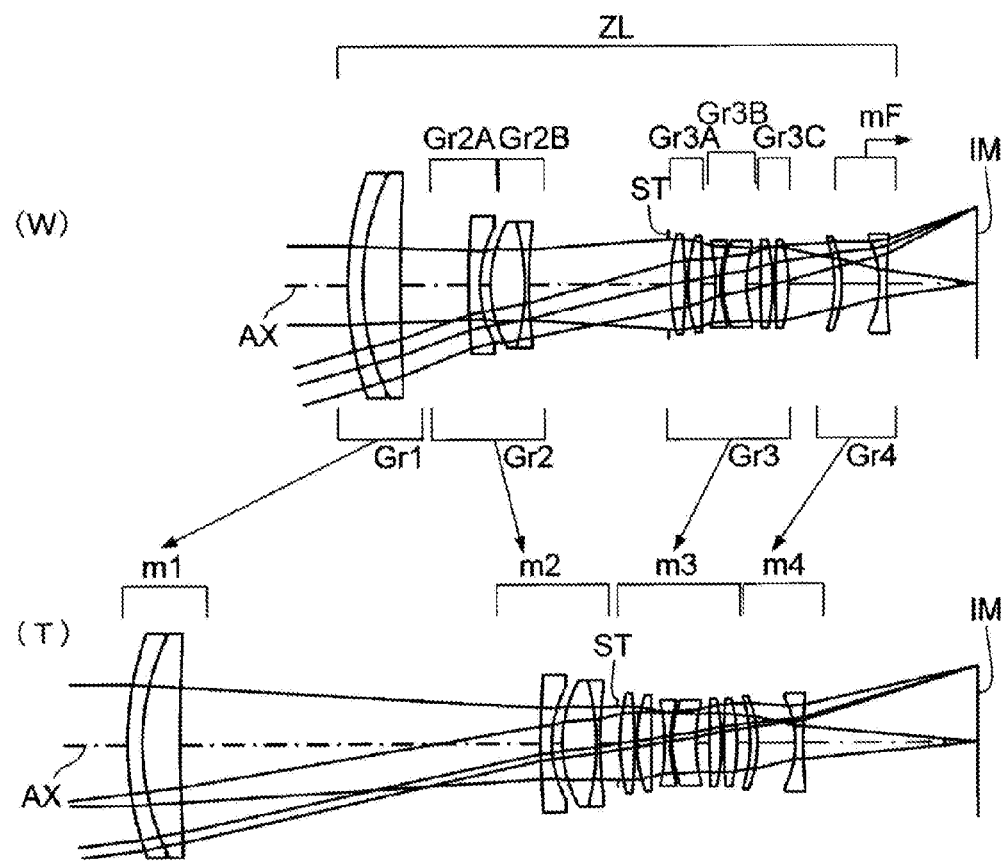
FIG. 9 is an optical composition diagram of a ninth embodiment (Example 9)
Figure 10:
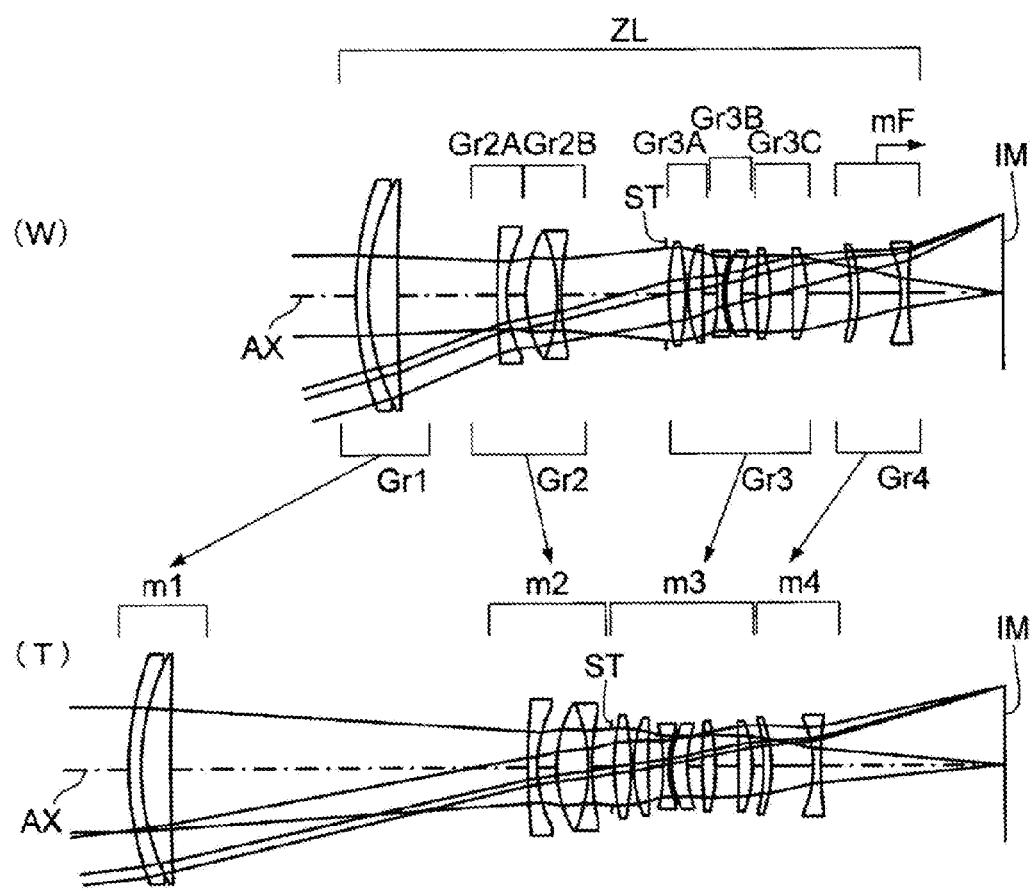
FIG. 10 is an optical composition diagram of a tenth embodiment (Example 10)
Figure 11:
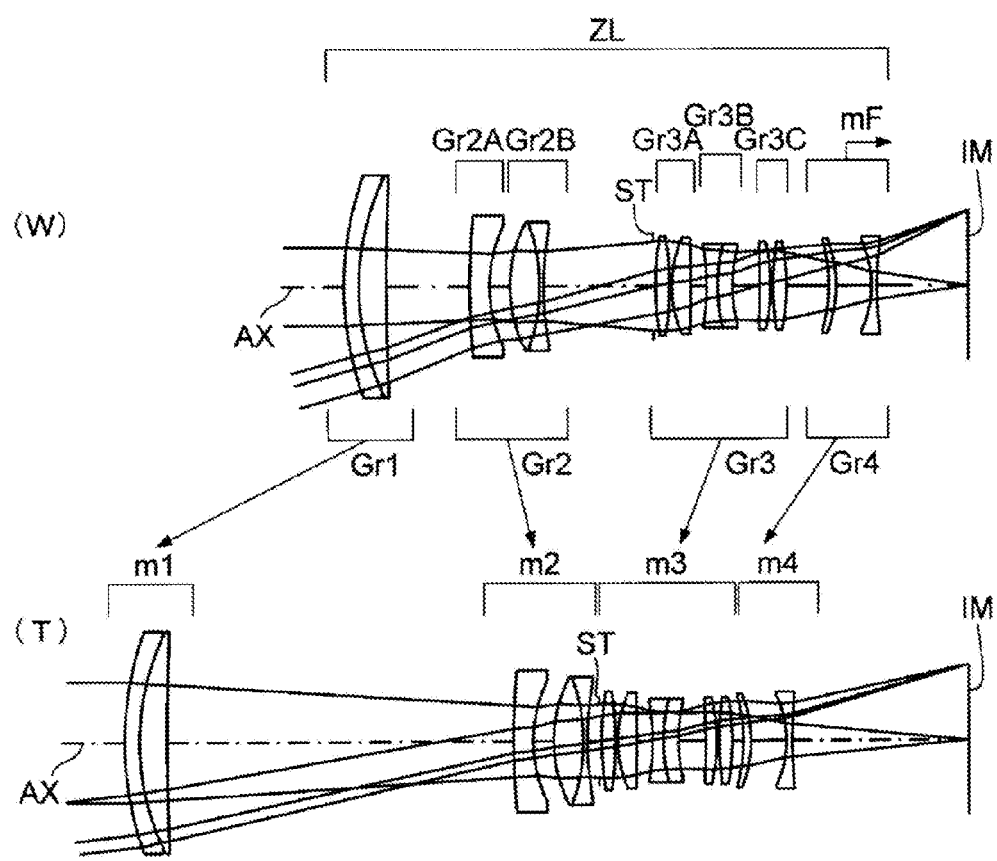
FIG. 11 is an optical composition diagram of an eleventh embodiment (Example 11)
Figure 12A:
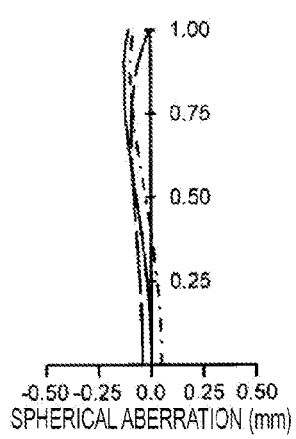
FIGS. 12A-I are aberration diagrams corresponding to Example 1.
Figure 12B:
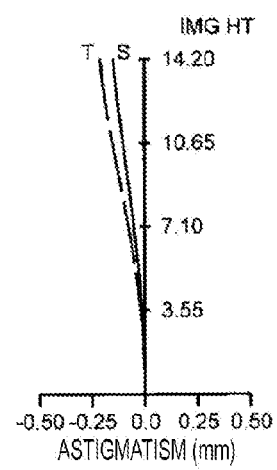
Figure 12C:
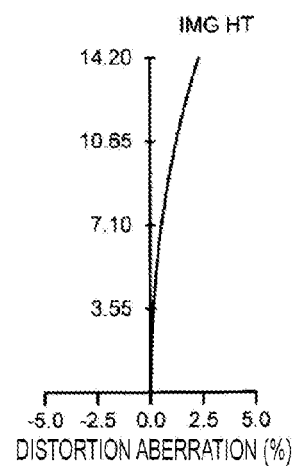
Figure 12D:
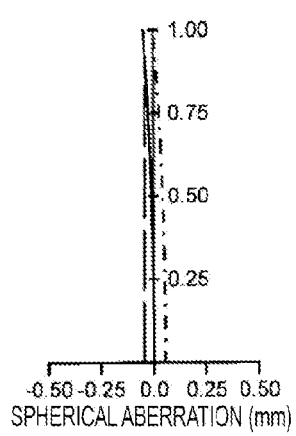
Figure 12E:
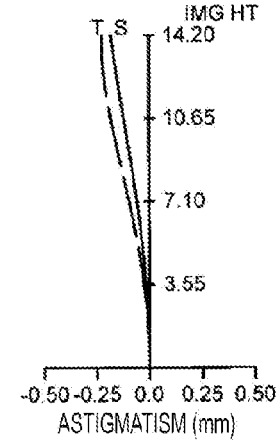
Figure 12F:
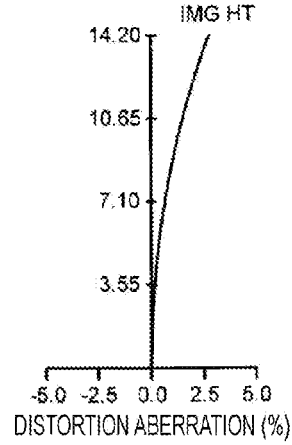
Figure 12G:
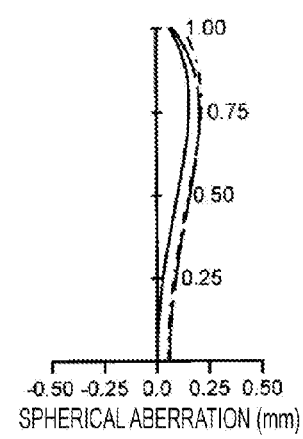
Figure 12H:
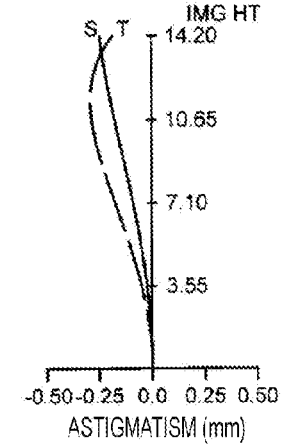
Figure 12I:
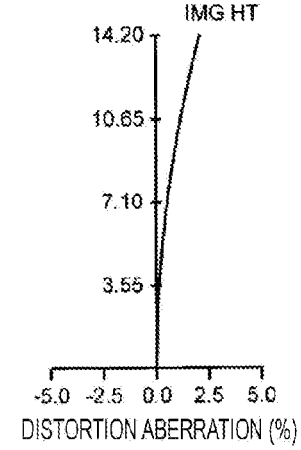
Figure 13A:
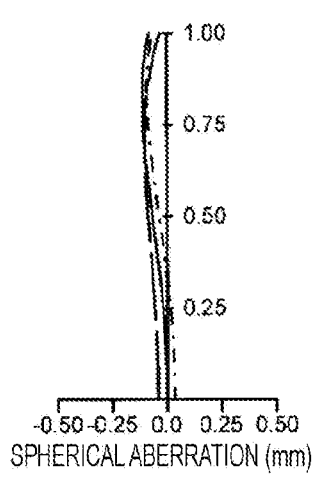
FIGS. 13A-I are aberration diagrams corresponding to Example 2.
Figure 13B:
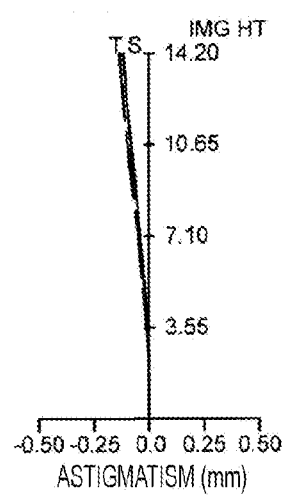
Figure 13C:
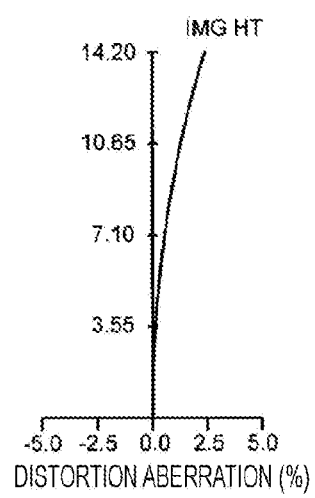
Figure 13D:
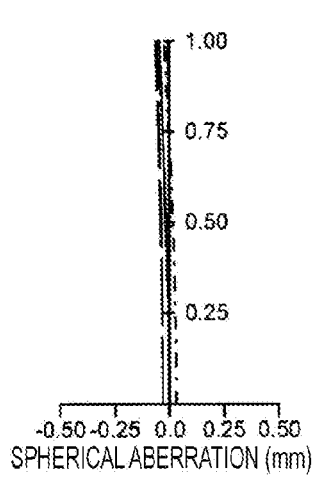
Figure 13E:
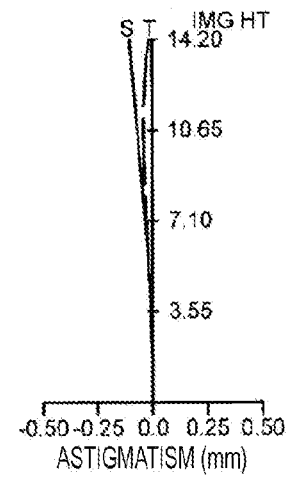
Figure 13F:
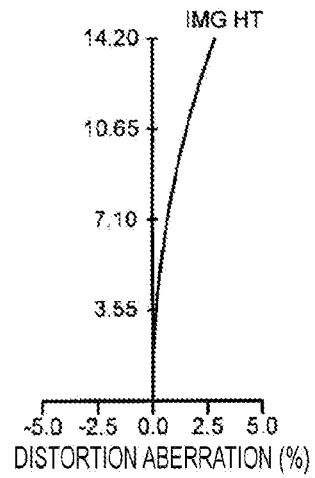
Figure 13G:
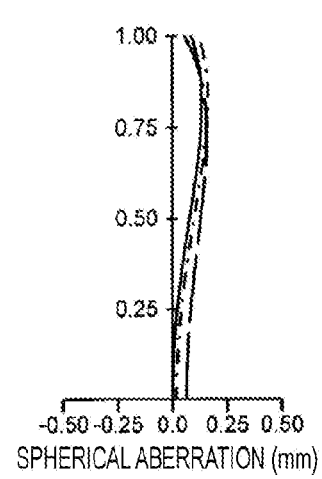
Figure 13H:
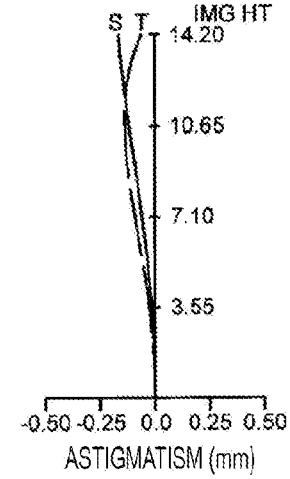
Figure 13I:
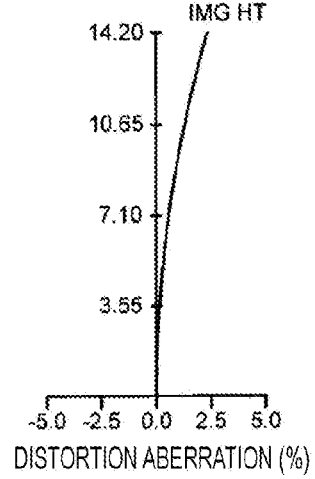
Figure 14A:
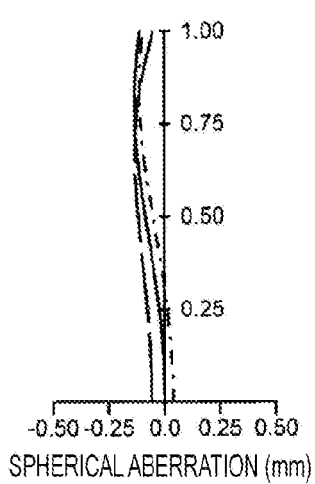
FIGS. 14A-I are aberration diagrams corresponding to Example 3.
Figure 14B:
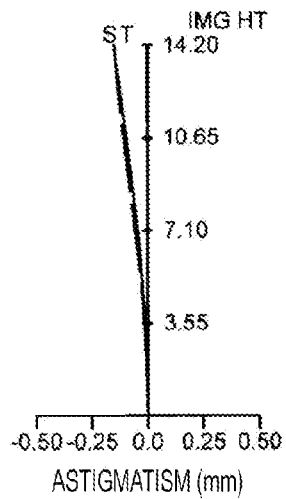
Figure 14C:
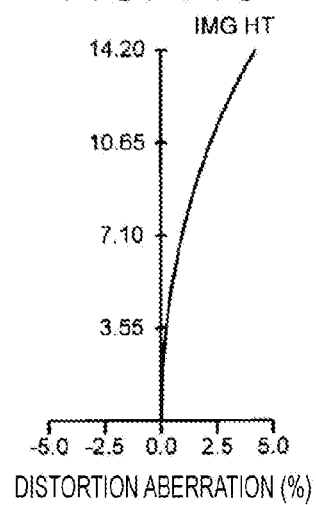
Figure 14D:
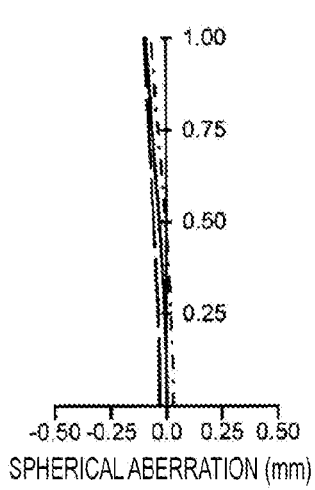
Figure 14E:
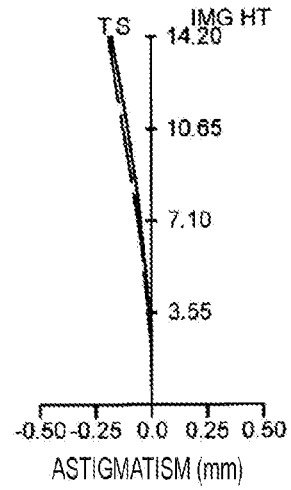
Figure 14F:
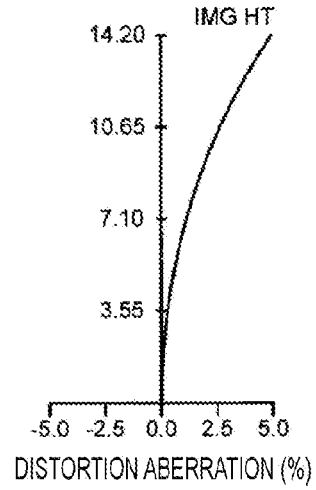
Figure 14G:
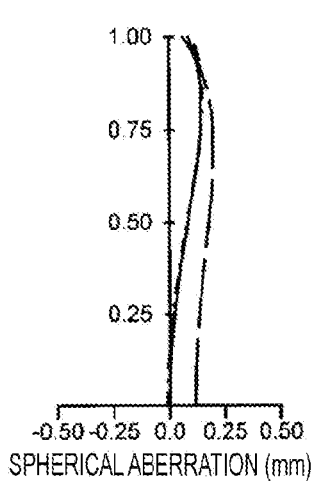
Figure 14H:
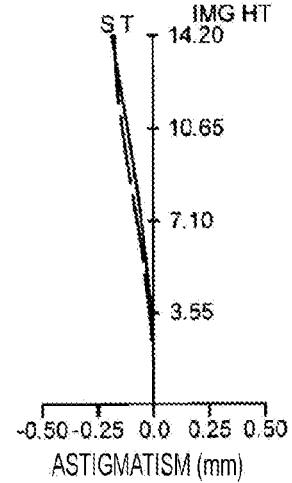
Figure 14I:
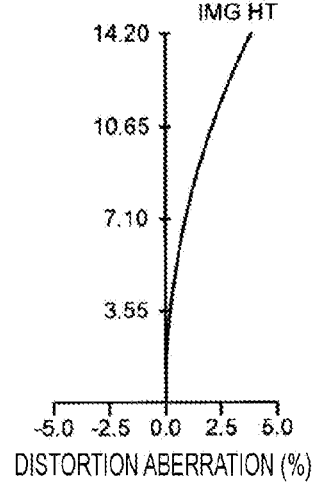
Figure 15A:
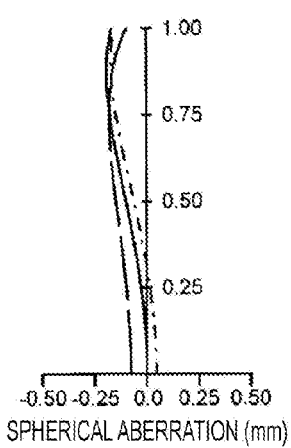
FIGS. 15A-I are aberration diagrams corresponding to Example 4.
Figure 15B:
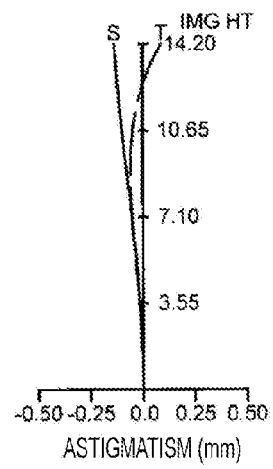
Figure 15C:
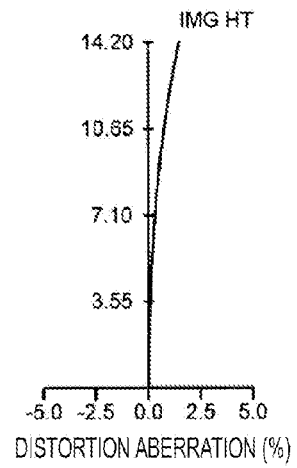
Figure 15D:
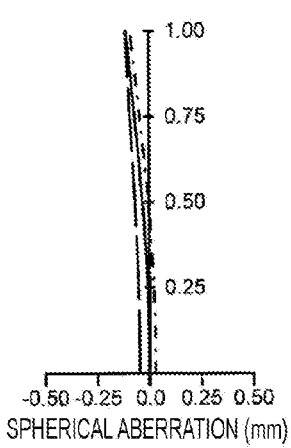
Figure 15E:
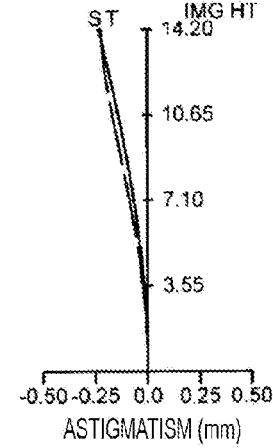
Figure 15F:
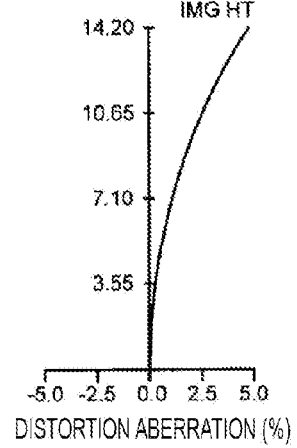
Figure 15G:
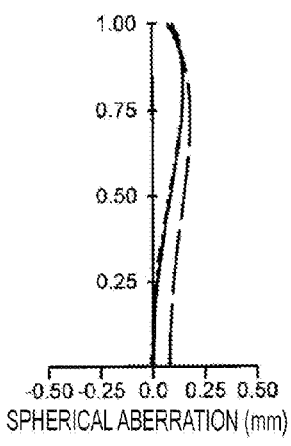
Figure 15H:
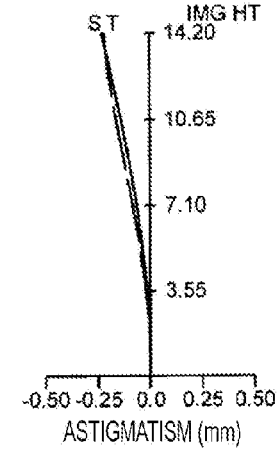
Figure 15I:
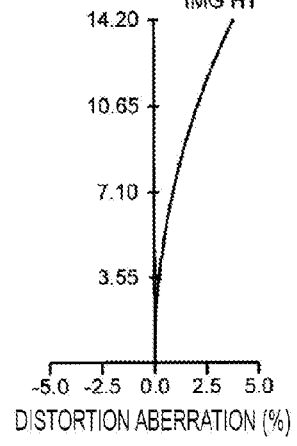
Figure 16A:
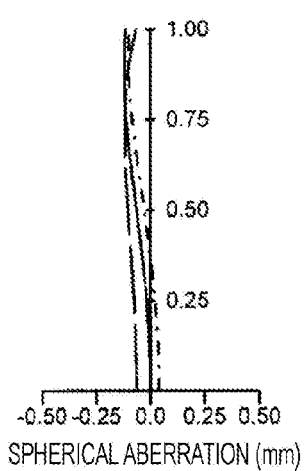
FIGS. 16A-I are aberration diagrams corresponding to Example 5.
Figure 16B:
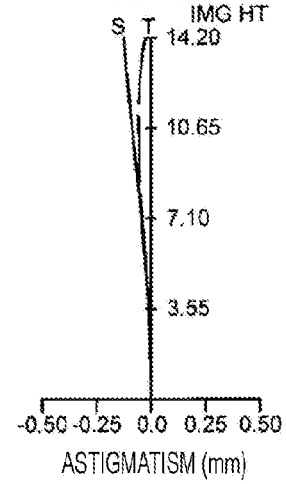
Figure 16C:
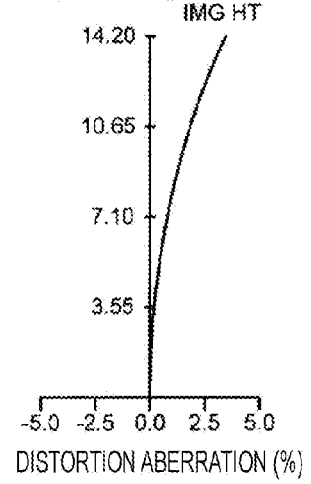
Figure 16D:
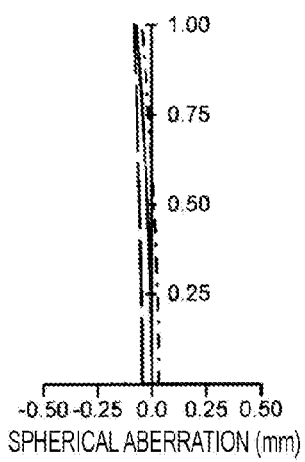
Figure 16E:
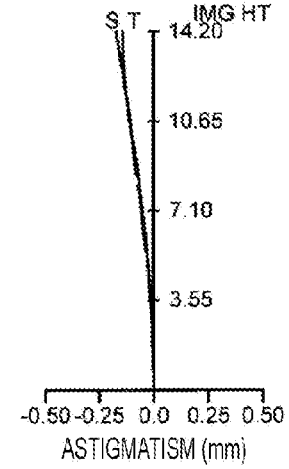
Figure 16F:
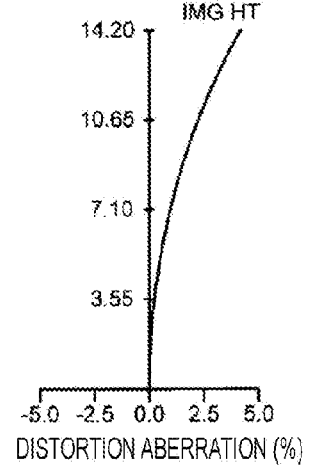
Figure 16G:
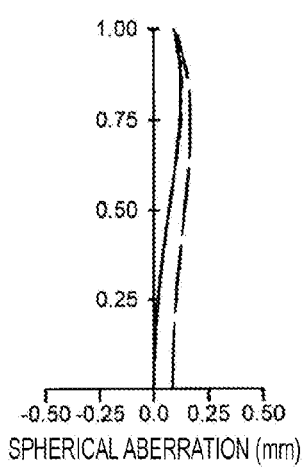
Figure 16H:
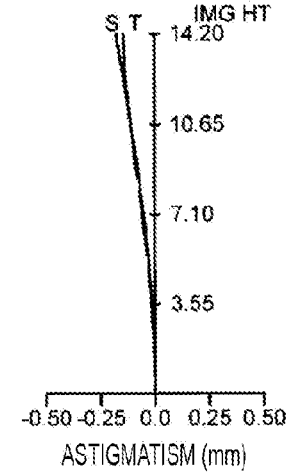
Figure 16I:
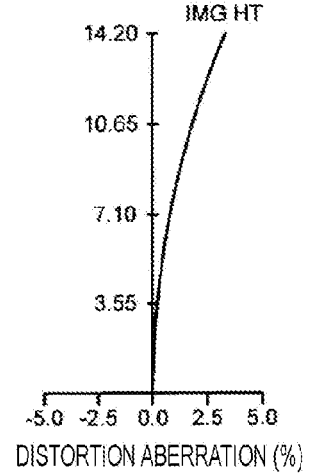
Figure 17A:
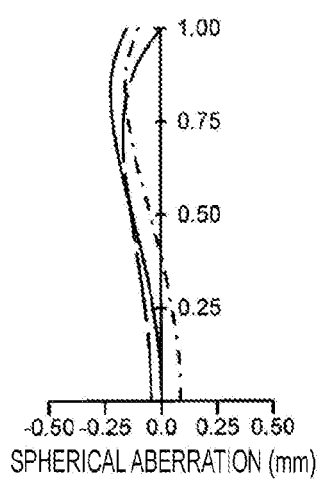
FIGS. 17A-I are aberration diagrams corresponding to Example 6.
Figure 17B:
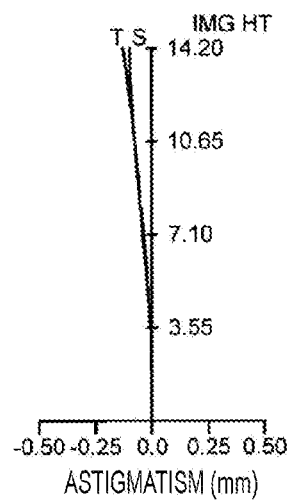
Figure 17C:
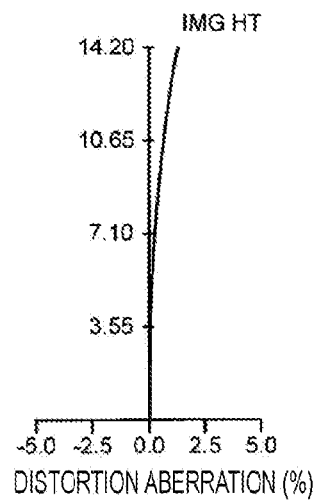
Figure 17D:
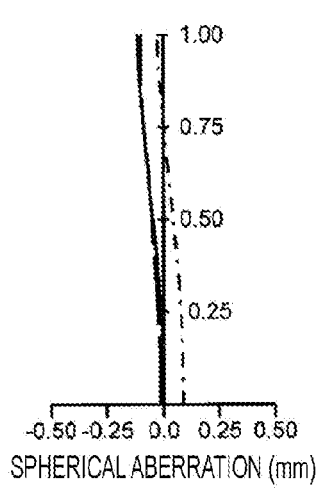
Figure 17E:
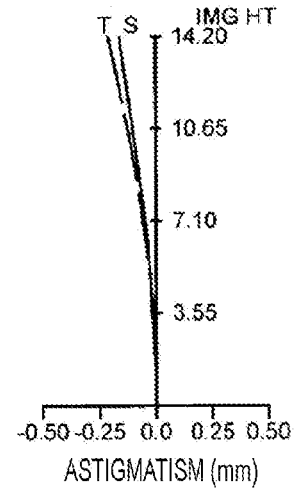
Figure 17F:
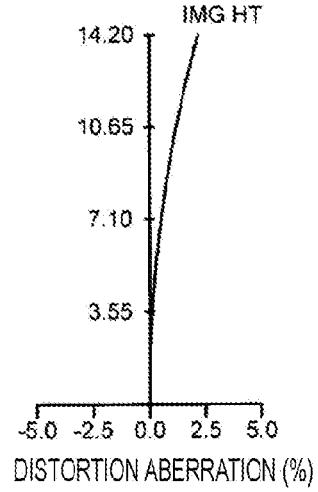
Figure 17G:
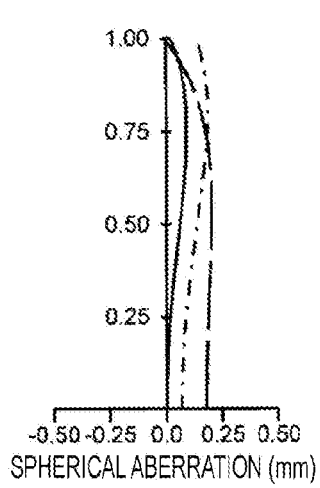
Figure 17H:
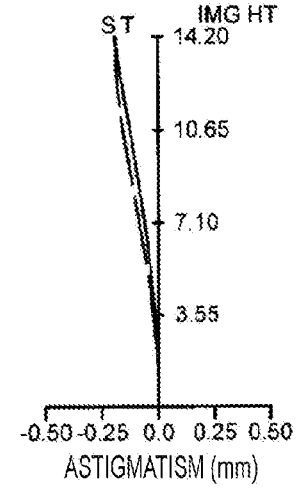
Figure 17I:
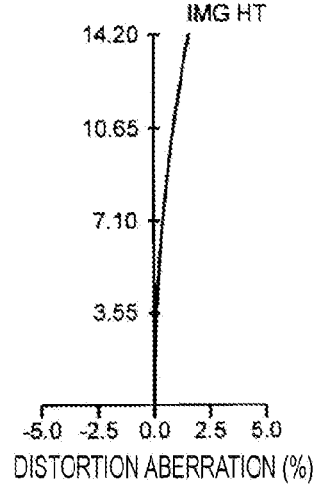
Figure 18A:
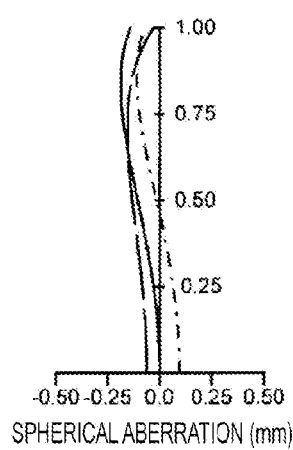
FIGS. 18A-I are aberration diagrams corresponding to Example 7.
Figure 18B:
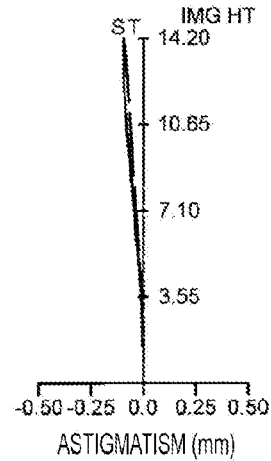
Figure 18C:
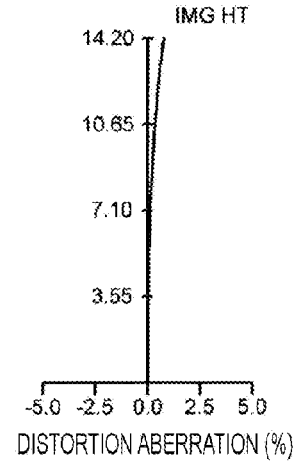
Figure 18D:
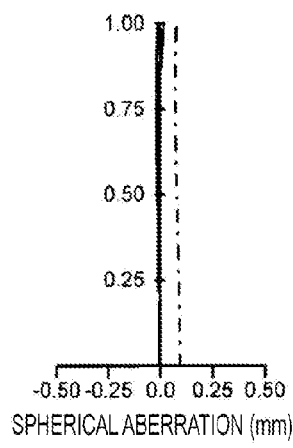
Figure 18E:
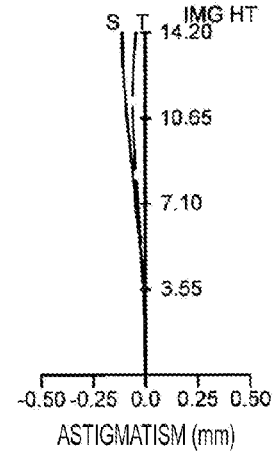
Figure 18F:
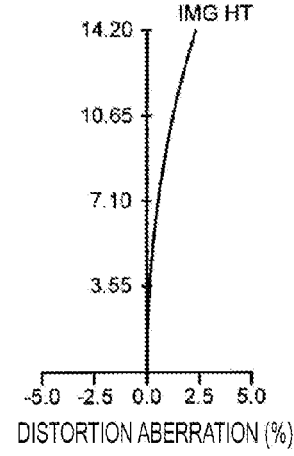
Figure 18G:
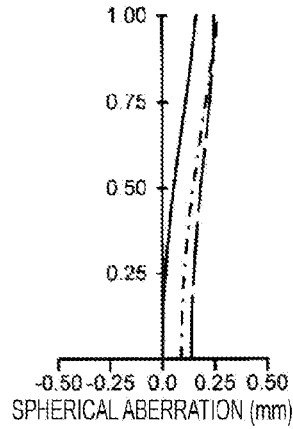
Figure 18H:
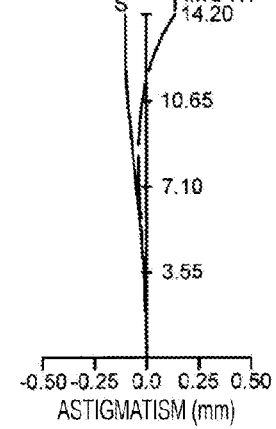
Figure 18I:
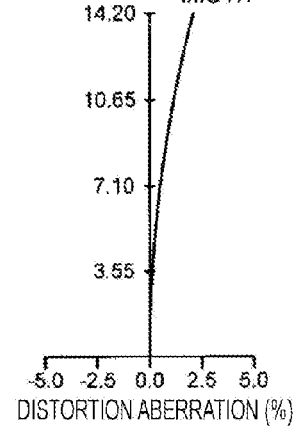
Figure 19A:
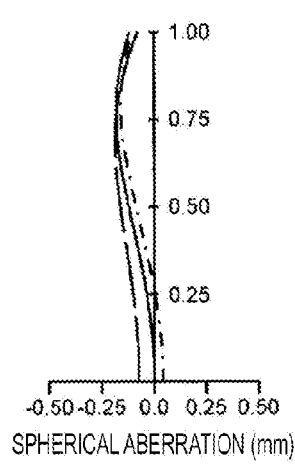
FIGS. 19A-I are aberration diagrams corresponding to Example 8.
Figure 19B:
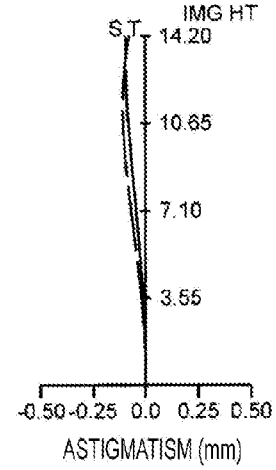
Figure 19C:
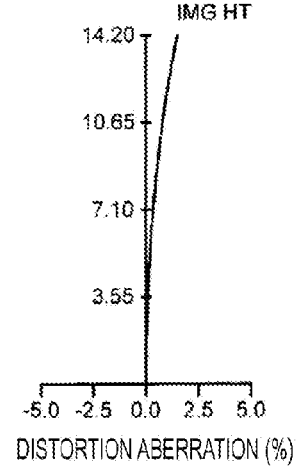
Figure 19D:
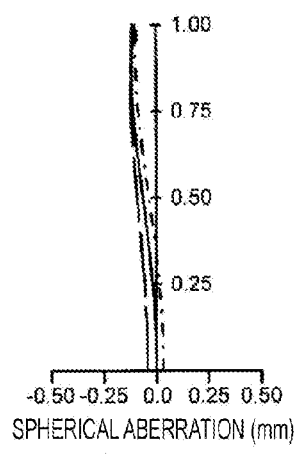
Figure 19E:
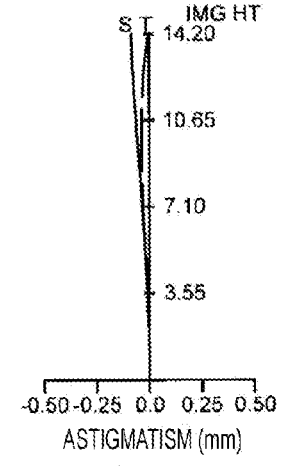
Figure 19F:
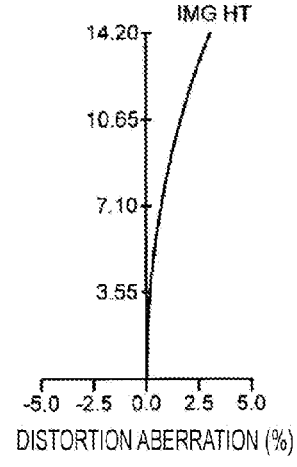
Figure 19G:
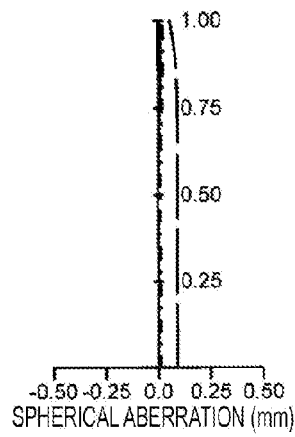
Figure 19H:
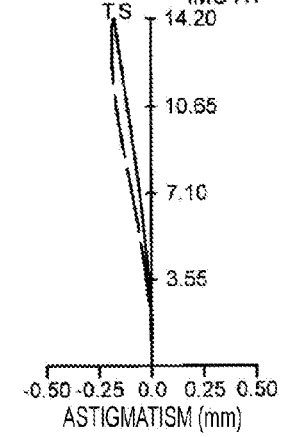
Figure 19I:
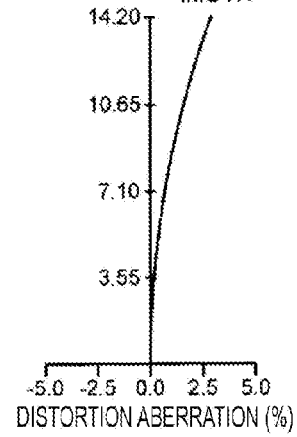
Figure 20A:
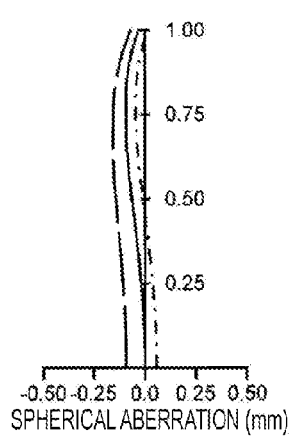
FIGS. 20A-I are aberration diagrams corresponding to Example 9.
Figure 20B:
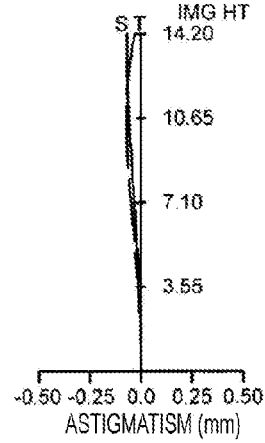
Figure 20C:
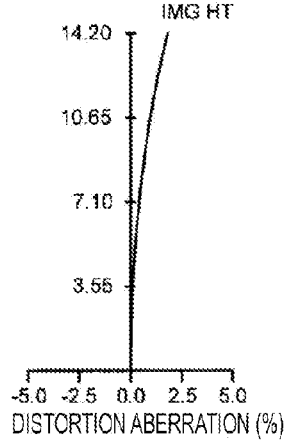
Figure 20D:
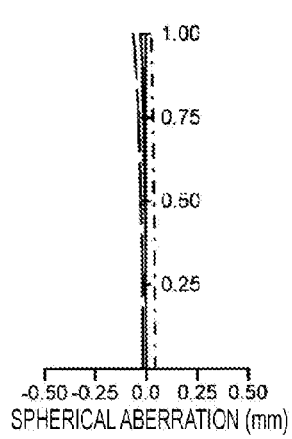
Figure 20E:
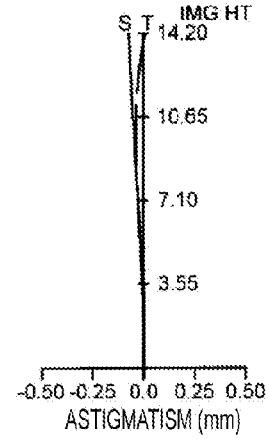
Figure 20F:
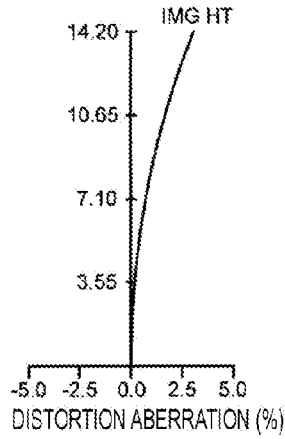
Figure 20G:
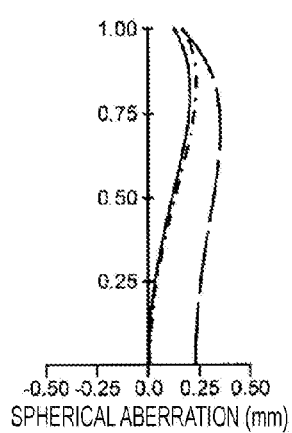
Figure 20H:
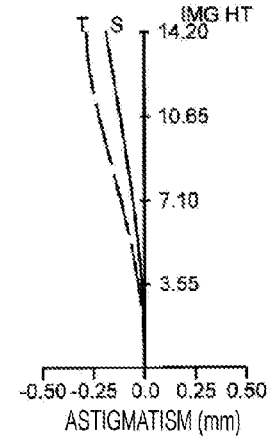
Figure 20I:
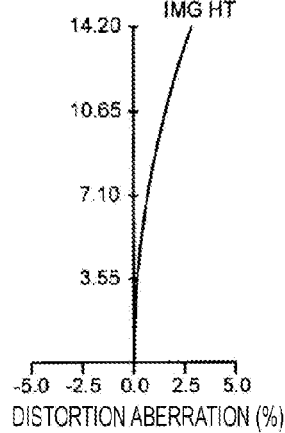
Figure 21A:
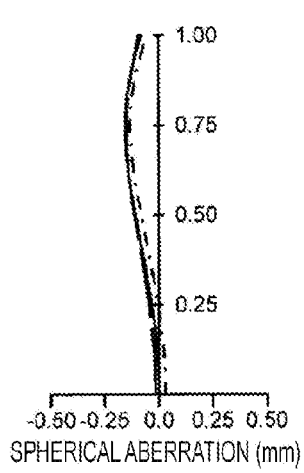
FIGS. 21A-I are aberration diagrams corresponding to Example 10.
Figure 21B:
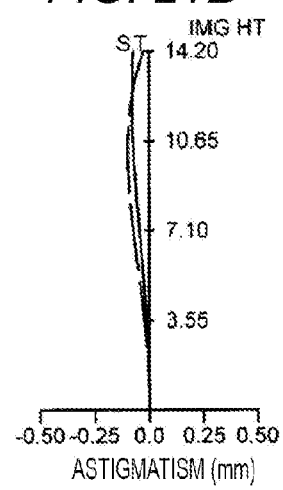
Figure 21C:
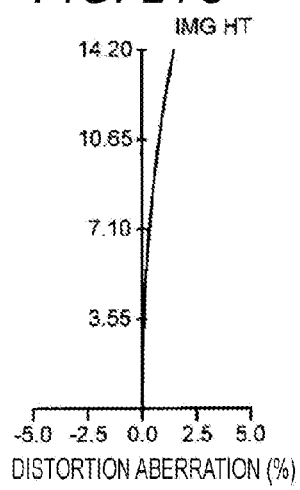
Figure 21D:
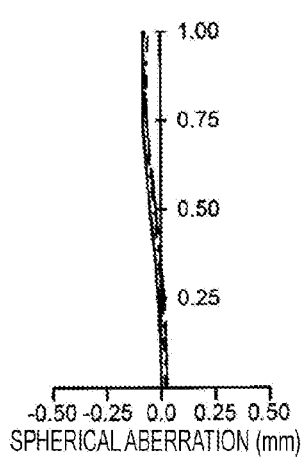
Figure 21E:
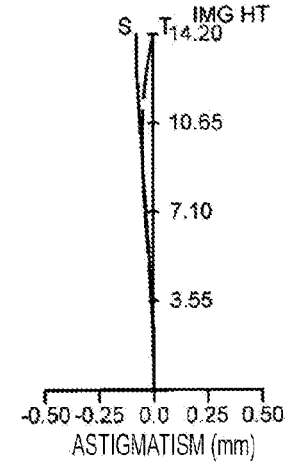
Figure 21F:
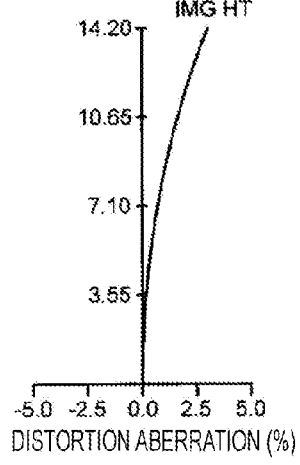
Figure 21G:
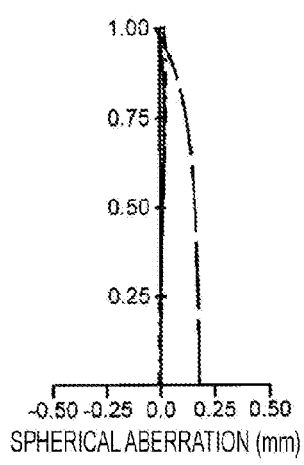
Figure 21H:
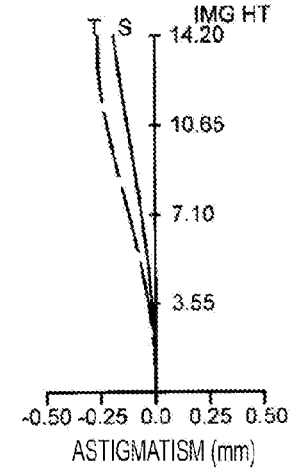
Figure 21I:
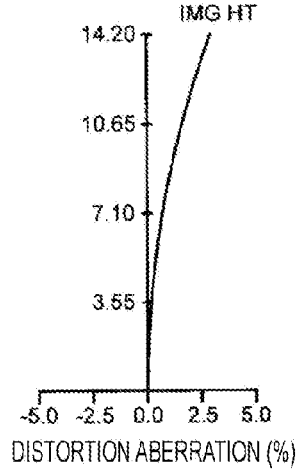
Figure 22A:
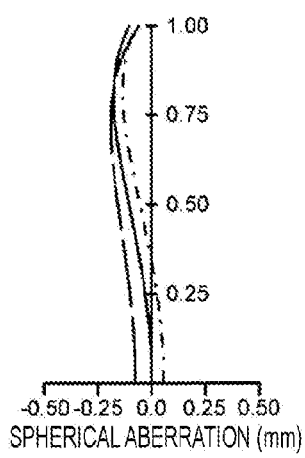
FIGS. 22A-I are aberration diagrams corresponding to Example 11.
Figure 22B:
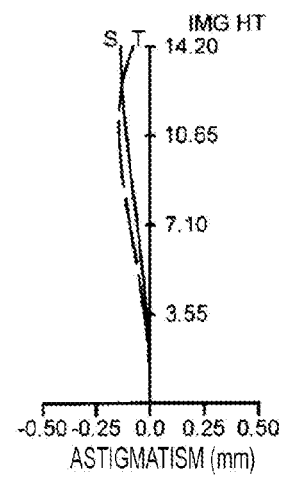
Figure 22C:
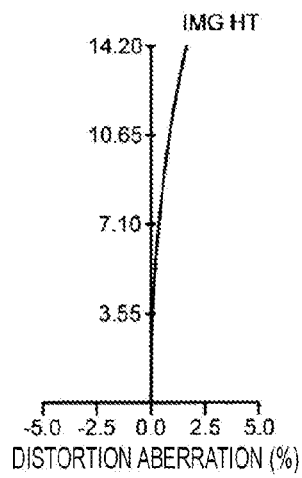
Figure 22D:
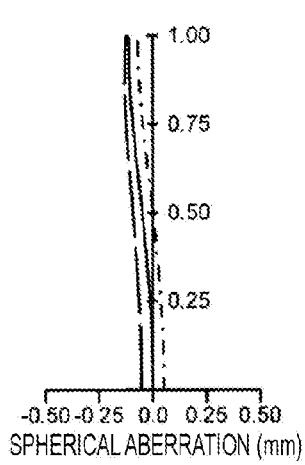
Figure 22E:
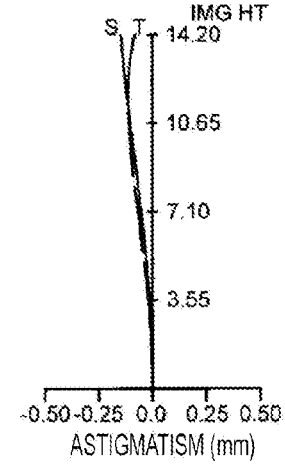
Figure 22F:
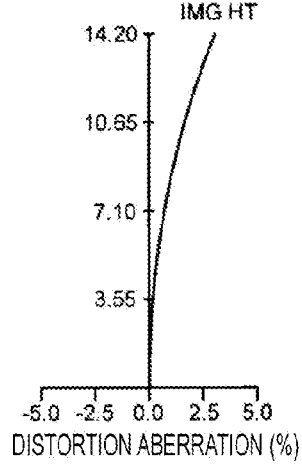
Figure 22G:
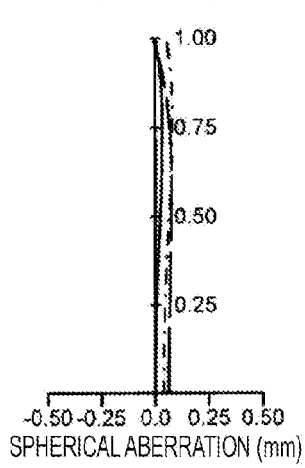
Figure 22H:
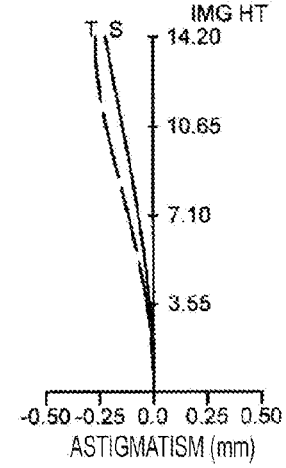
Figure 22I:
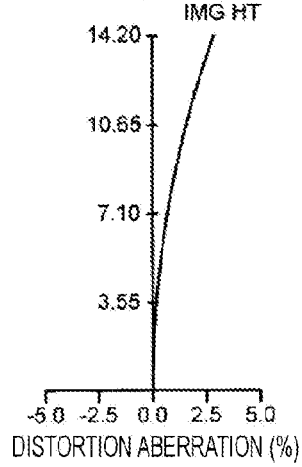

Hereinafter, an embodiment of the present invention will be described with reference to the drawings. However, the scope of the invention is not limited to the illustrated examples.

Description is given below of a zoom lens, an imaging optical apparatus, and a digital device according to embodiments of the present invention. A zoom lens according to an embodiment of the present invention is configured such that magnification is varied by change of inter-group spacings to be caused by movement of a plurality of lens groups along the optical axis. The zoom lens includes, in the order from the object side, a first group of positive power, a second group of negative power, a third group of positive power, and a fourth group of negative power (the power indicates the amount defined by the reciprocal of the focal distance). The zoom lens is configured such that, in varying magnification from a wide-angle end to a telephoto end, the first group is moved toward the object side, the second group is moved toward the image side, the third group is moved toward the object side, and the fourth group is moved toward the object side, in such a way as to satisfy the following conditional equations (1) to (3):

$$-0.63 < f2/f1 < -0.25 \quad (1);$$

$$-10 < f2/y'\text{max} < -3 \quad (2);$$

$$6 < f1/y'\text{max} < 20 \quad (3),$$

where f1: the focal distance of the first group;

f2: the focal distance of the second group; and y'max: the maximum image height.

For the above-described zoom configuration, a positive group-preceding configuration is adopted so as to achieve favorable optical performance and compact size of the telephotographing zoom lens. Further, the power arrangement is such that the second group is negative and the third group is positive; thus, the lens back is secured with a retrofocusing power arrangement at the wide-angle end. In the meanwhile, the spacing between the second group and the third group is set shorter to reduce the retrofocusing power at the telephoto end, such that a compact full length is achieved.

The conditional equation (1) is for appropriately setting the focal distances of the first group and the second group. Below the lower limit of the conditional equation (1), the power of the negative second group is too weak against the positive first group, making it difficult to correct spherical aberration, coma aberration, and field curvature that could occur in the first group. Above the upper limit of the conditional equation (1), power shortage of the first group is likely, causing increase in amount of movement of the first group in varying magnification and thus making it difficult to shorten the full length. Hence, improvement in optical performance and shortening of the full length are achieved in a well-balanced manner by satisfying the conditional equation (1).

The conditional equation (2) is for appropriately setting the focal distance of the second group. Below the lower limit of the conditional equation (2), the focal distance of the second group is too long, making it difficult to shorten the full length due to an increased amount of movement of the second group in varying magnification. Above the upper limit of the conditional equation (2), the power of the second group is too strong, thus enhancing deterioration in performance in the event of decentering due to manufacturing error. Further, high-order spherical aberration or coma aberration which could occur in the second group is enhanced. Hence, improvement in optical performance and shortening of the full length are achieved in a well-balanced manner by satisfying the conditional equation (2).

The conditional equation (3) is for appropriately setting the focal distance of the first group. Below the lower limit of the conditional equation (3), the focal distance of the first group is too long, making it difficult to shorten the entire length due to an increased amount of movement of the first group in varying magnification. Above the upper limit of the conditional equation (3), the power of the first group is too strong, thus enhancing deterioration in performance in the event of decentering due to manufacturing error. Further, high-order spherical aberration or coma aberration which could occur in the first group is magnified. Hence, improvement in optical performance and shortening of the full length are achieved in a well-balanced manner by satisfying the conditional equation (3).

The above characteristic configuration allows for achievement of a zoom lens, even with a viewing angle (2ω) at a telephoto end of less than 15°, with a compact design and higher produceability while having favorable optical performance in the entire zoon range, as well as an imaging optical apparatus including the lens. The zoom lens or the image optical apparatus is applicable to a digital device, e.g., a digital camera, thus adding a high-performance image input function to the digital device in a compact manner. This contributes to reduction in size and cost, improvement in performance, and sophistication of functions, to name a few, of the digital device. For example, since the zoom lens according to an embodiment of the present invention is suitably used as an interchangeable lens for a digital camera or a video camera, a lightweight and compact interchangeable lens with higher portability is achieved. Description is given below of conditions and other factors for obtaining such effects in a well-balanced manner and also for achieving, for example, still higher optical performance and reduction in size.

The following conditional equation (1a) is further preferably satisfied:

$$-0.58 < f2/f1 < -0.30 \quad (1a)$$

This conditional equation (1a) defines a further preferred conditional range in the conditional range defined by the conditional equation (1) based on, for example, the above aspects. Hence, the conditional equation (1a) is preferably satisfied to increase the above effects.

The following conditional equation (2a) is further preferably satisfied:

$$-8 < f2/y'\text{max} < -3.4 \quad (2a)$$

This conditional equation (2a) defines a further preferred conditional range in the conditional range defined by the conditional equation (2) based on, for example, the above aspects. Hence, the conditional equation (2a) is preferably satisfied to increase the above effects.

The following conditional equation (3a) is further preferably satisfied:

$$8 < f1/y'\text{max} < 18 \quad (3a)$$

This conditional equation (3a) defines a further preferred conditional range in the conditional range defined by the conditional equation (3) based on, for example, the above aspects. Hence, the conditional equation (3a) is preferably satisfied to increase the above effects.

Where the inter-lens group spacing is an inter-lens spacing t satisfying a conditional equation (0): $0.14 < t/y'\text{max}$ of inter-lens spacings t in the third group, the third group preferably includes, from the order from the object side, a positive lens group, a negative lens group, and a positive lens group, and the following conditional equation (4) is preferably satisfied:

$$-0.7 < f3n/f3 < -0.4 \quad (4),$$

where
f3: the focal distance of the third group, and
f3n: the focal distance of the negative lens group in the third group.

The positive lens group on the object side in the third group includes lenses from, when calculation of t/y'max is performed in the order from the lens having the strongest negative power in the third group toward the object side, the first lens having an inter-lens spacing t with the adjacent lens of or larger than t/y'max=0.14 up to the lens closest to the object side in the third group.

The negative lens group in the third group includes a negative lens having the strongest power in the third group, and includes lenses from a lens that is next by one to the image side from, when calculation of t/y'max is performed in the order from the negative lens toward the object side, the first lens having an inter-lens spacing t with the adjacent lens of or larger than t/y'max=0.14 up to a lens that is next by one to the object side from, when calculation of t/y'max is performed in the order from the negative lens toward the image side, the first lens having an inter-lens spacing t with the adjacent lens of or larger than t/y'max=0.14.

The positive lens group on the image side in the third group includes lenses from, when calculation of t/y'max is performed in the order from the lens having the strongest negative power in the third group toward the image side, the first lens having an inter-lens spacing t with the adjacent lens of or larger than t/y'max=0.14 up to the lens closest to the image side in the third group.

The conditional equation (4) is for appropriately setting the focal distance in the third group. Below the lower limit of the conditional equation (4), the negative power in the third group is insufficient, causing increase of the Petzval sum and thus insufficient correction of field curvature. Above the upper limit of the conditional equation (4), the negative power in the third group is excessive, which relatively increases the power of the positive lens group, thus resulting in enhanced fluctuation in spherical aberration or coma aberration due to change in incident light in varying magnification. Further, deterioration in performance due to manufacturing error is also increased. Hence, improvement in optical performance is achieved in a well-balanced manner by satisfying the conditional equation (4).

The following conditional equation (4a) is further preferably satisfied.

$$-0.68 < f3n/f3 < -0.45 \quad (4a)$$

This conditional equation (4a) defines a further preferred conditional range in the conditional range defined by the conditional equation (4) based on, for example, the above aspects. Hence, the conditional equation (4a) is preferably satisfied to increase the above effects.

Where the inter-group spacing is an inter-lens spacing t satisfying the conditional equation (0):0.14<t/y'max of inter-lens spacings t in the second group, the second group preferably includes, from the order from the object side, a negative group and a positive group, and the positive group preferably has at least one cemented lens. Fluctuation in chromatic aberration in varying magnification is effectively suppressed by this configuration.

The second group preferably includes, as described above, in the order from the object side, a negative group and a positive group, and the following conditional equation (5) is preferably further satisfied:

$$0.4 < f2n/f2 < 1.4 \quad (5),$$

where
f2: the focal distance of the second group, and
f2n: the focal distance of the negative group in the second group.

The conditional equation (5) defines the focal distance of the negative group in the second group. Below the lower limit of the conditional equation (5), the focal distance of the negative group is too short, thus enhancing deterioration in performance due to, for example, manufacturing error such as decentering of a lens. Above the upper limit of the conditional equation (5), the negative power in the second group is insufficient, resulting in unsatisfactory correction of chromatic aberration in the second group and thus increased fluctuation in chromatic aberration in varying magnification. Further, the Petzval sum is increased, making it difficult to correct the field property. Hence, improvement in optical performance is achieved in a well-balanced manner by satisfying the conditional equation (5).

The following conditional equation (5a) is further preferably satisfied:

$$0.47 < f2n/f2 < 1.18 \quad (5a)$$

This conditional equation (5a) defines a further preferred conditional range in the conditional range defined by the conditional equation (5) based on, for example, the above aspects. Hence, the conditional equation (5a) is preferably satisfied to increase the above effects.

The negative group of the second group preferably includes a negative meniscus lens having a convex surface as a surface on the object side, and the positive group of the second group preferably includes a lens having a convex surface as a surface on the object side and a lens having a concave surface as a surface on the image side. As above, having a negative meniscus lens as a lens on the object side of the second group allows for prevention of extreme enlargement of the incident angle of incident light that changes while magnification is varied, and thus coma aberration on the surface on the object side is suppressed. Further, having a convex shape as a surface on the object side of the positive group in the second group allows for cancellation of negative spherical aberration that has occurred in the convex lens on the object side in the negative group, and enlargement of the lens is prevented by the effect of convergence. Having a concave surface shape of the surface on the image side of the lens closest to the image side facilitates correction of coma aberration or zooming chromatic aberration that could occur in the positive group of the second group.

For focusing from the infinity to a proximate object, the fourth group is preferably configured to be moved toward the image side along the optical axis. In this manner, the focusing group is easily reduced in weight and size. As a result, rapid focusing and downsizing of the entire lens camera cone are achieved.

The fourth group preferably has at least a positive lens and a negative lens. In this manner, fluctuation in on-axis chromatic aberration and zooming chromatic aberration in varying magnification is suppressed. Further, where the fourth group is the focusing group, fluctuation in on-axis chromatic aberration and zooming chromatic aberration is also suppressed, which could occur in focusing to a proximate object.

Any one of the positive lens groups in the third group preferably has at least two positive lenses. This allows for suppression of deterioration in performance which could happen by inhibiting a single lens from having extremely strong positive power.

The zoom lens according to an embodiment of the present invention is suitably used as an imaging lens of a digital device with an image input function, such as a lens-interchangeable digital camera. Combining such a zoom lens with, for example, an image sensor allows for configuration of an image optical apparatus operable to optically capture a picture of a photographing subject and to output the picture in the form of electrical signals. The imaging optical apparatus is a principal constituent optical device of a camera to be used for taking still images or shooting moving pictures of a photographing subject; for example, the apparatus includes, in the order from the object (i.e., the photographing subject) side, a zoom lens for forming an optical image of the object, and an image sensor for converting the optical image formed by the zoom lens into electrical signals. The zoom lens with the above-described features is arranged in such a manner as to form an optical image of the photographing subject on the photoreceiving surface (i.e., the imaging surface) of the image sensor, such that an imaging optical apparatus with higher performance besides a reduced size and cost and a digital device including the apparatus are achieved.

Exemplary digital devices with an image input function include digital cameras, video cameras, surveillance cameras, in-vehicle cameras, and cameras for video conference. Also included are personal computers, portable digital devices such as cell phones, smart phones, and mobile computers, peripheral devices for these devices such as scanners and printers, and other types of digital devices with a built-in or attached camera function. As can be seen from these examples, not only a camera is configurable by using the imaging optical apparatus, but also a camera function is attachable by installing the imaging optical apparatus in various devices. For example, a digital device with an image input function, such as a cell phone with a camera, is configurable.

Figure 23:
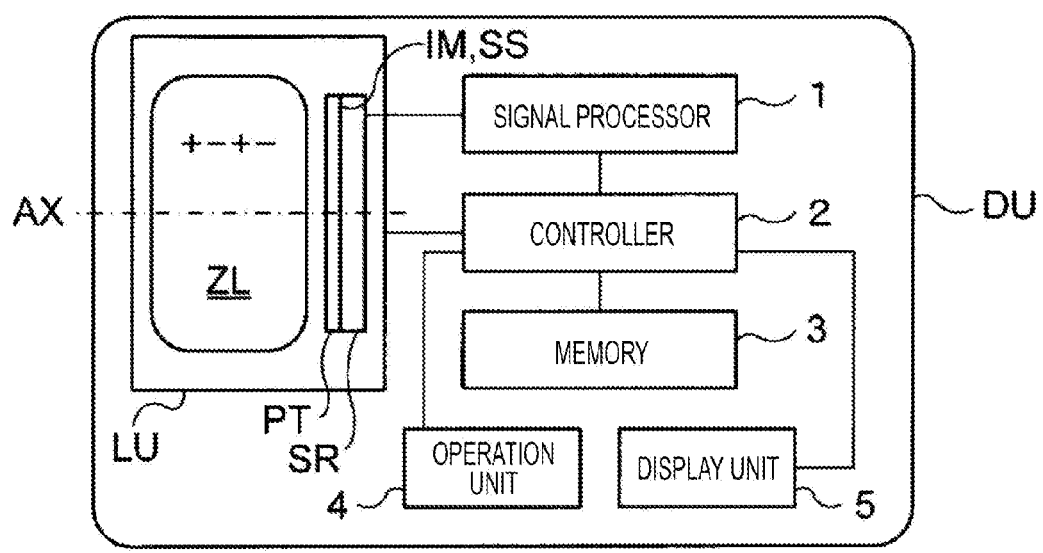
FIG. 23 is a schematic diagram depicting an exemplary configuration of a digital device installed with a zoom lens.

FIG. 23 depicts a schematic configuration example of a digital device DU in the form of a schematic profile to exemplify the digital device with an image input function. An imaging optical apparatus LU installed in the digital device DU depicted in FIG. 23 includes, in the order from the object (i.e., the photographing subject) side, a zoom lens ZL (AX: optical axis) configured to form an optical image (image surface) IM of an object in variable magnification, a plane parallel plate PT (corresponding to, for example, a cover glass of an image sensor SR; an optical filter such as an optical low-pass filter or an infrared cutoff filter disposed as needed), and the image sensor SR configured to convert the optical image IM that is formed by the zoom lens ZL on a photoreceiving surface (imaging surface) SS into electrical signals. In case where the imaging optical apparatus LU is used to configure the digital device DU with an image input function, the imaging optical apparatus LU is typically positioned inside the body, while any mode is adoptable as needed to implement a camera function. For example, a unitized imaging optical apparatus LU is configurable so as to be detachable or rotatable with respect to the main body of the digital device DU.

The zoom lens ZL is a four-component zoom lens including, in the order from the object side, a positive lens group, a negative lens group, a positive lens group, and a negative lens group. Varying of magnification, i.e., zooming, from a wide-angle end to a telephoto end is performed by changing the spacings between the groups (inter-group spacings). For varying the magnification from the wide-angle end to the telephoto end, the first group is configured to be moved toward the object side, the second group is configured to be moved toward the image side, the third group is configured to be moved toward the object side, and the fourth group is configured to be moved toward the object side. A solid-state image sensor such as a CCD (Charge Coupled Device) image sensor having a plurality of pixels or a CMOS (Complementary Metal-Oxide Semiconductor) image sensor is usable for the image sensor SR. The zoom lens ZL is positioned such that the optical image IM of a photographing subject is formed on the photoreceiving surface SS serving as a photoelectric converter of the image sensor SR; thus, the optical image IM formed by the zoom lens ZL is converted by the image sensor SR into electrical signals.

The digital device DU includes, in addition to the imaging optical apparatus LU, a signal processor 1, a controller 2, a memory 3, an operation unit 4, and a display unit 5. Signals generated at the image sensor SR are subjected to, for example, predetermined digital image processing and image compression processing at the signal processor 1 as needed, so as to be recorded as digital picture signals on the memory 3 (e.g., a semiconductor memory or an optical disk), or depending on the circumstances, to be transmitted to another device through a cable or in the converted form of, for example, infrared signals (e.g., a communication function of a cell phone). The controller 2 includes a microcomputer and intensively performs control of functions such as a photographing function including a still image photographing function and a moving picture shooting function and an image replay function; and control of lens moving mechanism for, for example, zooming, focusing, and image stabilization. For example, the controller 2 performs control over the imaging optical apparatus LU so as to perform at least one of still image photographing or moving picture shooting of a photographing subject. The display unit 5 includes a display such as a liquid crystal monitor and is configured to perform image display by using image signals converted by the image sensor SR or image information recorded on the memory 3. The operation unit 4 includes an operation member including an operation button such as a release button and an operation dial such as a photographing mode dial, and is configured to transmit to the controller 2 information that the operator inputs through an operation.

The specific optical composition of the zoom lens ZL is described here in further detail in connection with first to eleventh embodiments. FIGS. 1 to 11 are optical composition diagrams corresponding to each of the zoom lenses ZL that configure the first to eleventh embodiments, and the figures depict lens arrangements and lens shapes at a wide-angle end (W) and a telephoto end (T) in optical profile. These zoom lenses ZL each include, in the order from the object side, a first group Gr1 of positive power, a second group Gr2 of negative power, a third group Gr3 of positive power, and a fourth group Gr4 of negative power.

The arrows m1, m2, m3, and m4 in the optical composition diagrams (FIGS. 1 to 11) schematically represent the movement of the first group Gr1, the second group Gr2, the third group Gr3, and the fourth group Gr4, respectively, in zooming from the wide-angle end (W) to the telephoto end (T). In this manner, the zoom lenses ZL are configured to perform the variable magnification process, i.e., zooming, from the wide-angle end (W) to the telephoto end (T) by changing the inter-group spacings on the axis. In varying magnification, the first group Gr1, the second group Gr2, the third group Gr3, and the fourth group Gr4 are each moved relative to the image surface IM. A diaphragm (aperture diaphragm) ST is located on the object side of the third group Gr3 and is moved together with the third group Gr3 when magnification is varied. For varying magnification from the wide-angle end (W) to the telephoto end (T), the spacing between the first group Gr1 and the second group Gr2 is increased, the spacing between the second group Gr2 and the third group Gr3 is decreased, the spacing between the third group Gr3 and the fourth group Gr4 is decreased, and the spacing between the fourth group Gr4 and the image surface IM is increased. In focusing, the fourth group Gr4 is moved along the optical axis AX. In other words, the fourth group Gr4 is a focusing group, and is moved toward the image surface IM side as indicated by the arrows mF in focusing from the infinity to an object at a short distance.

In the first to fifth and eighth to eleventh embodiments, the second group Gr2 includes, in the order from the object side, a negative group Gr2A and a positive group Gr2B. More specifically, the second group Gr2 includes, in the order from the object side, the negative group Gr2A and the positive group Gr2B that has at least one cemented lens, where the inter-group spacing is an inter-lens spacing t satisfying the conditional equation (0):$0.14 < t/y'\max$ of the inter-lens spacings t in the second group Gr2.

In the first to eleventh embodiments, the third group Gr3 includes, in the order from the object side, a positive lens group Gr3A, a negative lens group Gr3B, and a positive lens group Gr3C. More specifically, the third group Gr3 includes, in the order from the object side, the positive lens group Gr3A, the negative lens group Gr3B, and the positive lens group Gr3C, where the inter-group spacing is an inter-lens spacing t satisfying the conditional equation (0):$0.14 < t/y'\max$ of the inter-lens spacings t in the third group Gr3. It is to be noted that the positive lens group Gr3A on the object side in the third group Gr3 includes lenses from, when calculation of $t/y'\max$ is performed in the order from the lens having the strongest negative power in the third group Gr3 toward the object side, the first lens having an inter-lens spacing t with the adjacent lens of or larger than $t/y'\max = 0.14$ up to the lens closest to the object side in the third group Gr3. The negative lens group Gr3B in the third group Gr3 includes a negative lens with the strongest power in the third group Gr3, and includes lenses from the lens that is next by one to the image side from, when calculation of $t/y'\max$ is performed in the order from the aforementioned negative lens toward the object side, the first lens having an inter-lens spacing t with the adjacent lens of or larger than $t/y'\max = 0.14$ up to the lens that is next by one to the object side from, when calculation of $t/y'\max$ is performed in the order from the aforementioned negative lens toward the image side, the first lens having an inter-lens spacing t with the adjacent lens of or larger than $t/y'\max = 0.14$. Further, the positive lens group Gr3C on the image side in the third group Gr3 includes lenses from, when calculation of $t/y'\max$ is performed in the order from the lens with the strongest negative power in the third group Gr3 toward the image side, the first lens having an inter-lens spacing t with the adjacent lens of or larger than $t/y'\max = 0.14$ up to the lens closest to the image side in the third group Gr3.

The groups in the first embodiment (FIG. 1) are configured as follows in the order from the object side: The first group Gr1 includes one cemented lens comprised of a negative meniscus lens that is concave on the image side and a positive meniscus lens that is convex on the object side. In the second group Gr2, the negative group Gr2A includes a negative meniscus lens that is concave on the image side, and the positive group Gr2B includes a cemented lens comprised of a biconvex positive lens and a biconcave negative lens. In the third group Gr3, the positive lens group Gr3A includes a biconvex positive lens and a positive meniscus lens that is convex on the object side; the negative lens group Gr3B includes one biconcave negative lens; the positive lens group Gr3C includes a positive meniscus lens that is convex on the image side and a biconvex positive lens; and the diaphragm ST is positioned on the object side of the third group Gr3. The fourth group Gr4 includes a positive meniscus lens that is convex on the image side and a biconcave negative lens.

The groups in the second embodiment (FIG. 2) are configured as follows in the order from the object side: The first group Gr1 includes one cemented lens comprised of a negative meniscus lens that is concave on the image side and a positive meniscus lens that is convex on the object side. In the second group Gr2, the negative group Gr2A includes a negative meniscus lens that is concave on the image side, and the positive group Gr2B includes a cemented lens comprised of a biconvex positive lens and a biconcave negative lens. In the third group Gr3, the positive lens group Gr3A includes a biconvex positive lens and a positive meniscus lens that is convex on the object side; the negative lens group Gr3B includes a biconcave negative lens and a positive meniscus lens that is convex on the object side; the positive lens group Gr3C includes two biconvex positive lenses; and the diaphragm ST is positioned on the object side of the third group Gr3. The fourth group Gr4 includes a positive meniscus lens that is convex on the image side and a biconcave negative lens.

The groups in the third embodiment (FIG. 3) are configured as follows in the order from the object side: The first group Gr1 includes one cemented lens comprised of a negative meniscus lens that is concave on the image side and a positive meniscus lens that is convex on the object side. In the second group Gr2, the negative group Gr2A includes a negative meniscus lens that is concave on the image side, and the positive group Gr2B includes a cemented lens comprised of a biconvex positive lens and a biconcave negative lens. In the third group Gr3, the positive lens group Gr3A includes a biconvex positive lens and a positive meniscus lens that is convex on the object side; the negative lens group Gr3B includes a biconcave negative lens and a positive meniscus lens that is convex on the object side; the positive lens group Gr3C includes two biconvex positive lenses; and the diaphragm ST is positioned on the object side of the third group Gr3. The fourth group Gr4 includes a positive meniscus lens that is convex on the image side and a biconcave negative lens.

The groups in the fourth embodiment (FIG. 4) are configured as follows in the order from the object side: The first group Gr1 includes one cemented lens comprised of a negative meniscus lens that is concave on the image side and a positive meniscus lens that is convex on the object side. In the second group Gr2, the negative group Gr2A includes a negative meniscus lens that is concave on the image side, and the positive group Gr2B includes a cemented lens comprised of a biconvex positive lens and a biconcave negative lens. In the third group Gr3, the positive lens group Gr3A includes a biconvex positive lens and a positive meniscus lens that is convex on the object side; the negative lens group Gr3B includes a biconcave negative lens and a positive meniscus lens that is convex on the object side; the positive lens group Gr3C includes two biconvex positive lenses; and the diaphragm ST is positioned on the object side of the third group Gr3. The fourth group Gr4 includes a positive meniscus lens that is convex on the image side and a biconcave negative lens.

The groups in the fifth embodiment (FIG. 5) are configured as follows in the order from the object side: The first group Gr1 includes one cemented lens comprised of a negative meniscus lens that is concave on the image side and a positive meniscus lens that is convex on the object side. In the second group Gr2, the negative group Gr2A includes a negative meniscus lens that is concave on the image side, and the positive group Gr2B includes a cemented lens comprised of a biconvex positive lens and a biconcave negative lens. In the third group Gr3, the positive lens group Gr3A includes a biconvex positive lens and a positive meniscus lens that is convex on the object side; the negative lens group Gr3B includes a biconcave negative lens and a positive meniscus lens that is convex on the object side; the positive lens group Gr3C includes two biconvex positive lenses; and the diaphragm ST is positioned on the object side of the third group Gr3. The fourth group Gr4 includes a positive meniscus lens that is convex on the image side and a biconcave negative lens.

The groups in the sixth embodiment (FIG. 6) are configured as follows in the order from the object side: The first group Gr1 includes a cemented lens comprised of a negative meniscus lens that is concave on the image side and a biconvex positive lens, and a positive meniscus lens that is convex on the object side. The second group Gr2 includes a negative meniscus lens that is concave on the image side, a biconvex positive lens, and a biconcave negative lens. In the third group Gr3, the positive lens group Gr3A includes one biconvex positive lens; the negative lens group Gr3B includes one biconcave negative lens; the positive lens group Gr3C includes a positive meniscus lens that is convex on the image side and a biconvex positive lens; and the diaphragm ST is positioned on the object side of the third group Gr3. The fourth group Gr4 includes a positive meniscus lens that is convex on the image side and a plano-concave negative lens with the concave surface oriented to the object side.

The groups in the seventh embodiment (FIG. 7) are configured as follows in the order from the object side: The first group Gr1 includes a cemented lens comprised of a negative meniscus lens that is concave on the image side and a biconvex positive lens, and a positive meniscus lens that is convex on the object side. The second group Gr2 includes a biconvex positive lens, a biconcave negative lens, and a positive meniscus lens that is convex on the object side. In the third group Gr3, the positive lens group Gr3A includes one biconvex positive lens; the negative lens group Gr3B includes one biconcave negative lens; the positive lens group Gr3C includes a positive meniscus lens that is convex on the image side and a biconvex positive lens; and the diaphragm ST is positioned on the object side of the third group Gr3. The fourth group Gr4 includes a positive meniscus lens that is convex on the image side and a biconcave negative lens.

The groups in the eighth embodiment (FIG. 8) are configured as follows in the order from the object side: The first group Gr1 includes one cemented lens comprised of a negative meniscus lens that is concave on the image side and a positive meniscus lens that is convex on the object side. In the second group Gr2, the negative group Gr2A includes a negative meniscus lens that is concave on the image side, and the positive group Gr2B includes a cemented lens comprised of a biconvex positive lens and a biconcave negative lens. In the third group Gr3, the positive lens group Gr3A includes a biconvex positive lens and a positive meniscus lens that is convex on the object side; the negative lens group Gr3B includes a biconcave negative lens and a positive meniscus lens that is convex on the object side; the positive lens group Gr3C includes a biconvex positive lens and a positive meniscus lens that is convex on the image side; and the diaphragm ST is positioned on the object side of the third group Gr3. The fourth group Gr4 includes a positive meniscus lens that is convex on the image side and a biconcave negative lens.

The groups in the ninth embodiment (FIG. 9) are configured as follows in the order from the object side: The first group Gr1 includes one cemented lens comprised of a negative meniscus lens that is concave on the image side and a positive meniscus lens that is convex on the object side. In the second group Gr2, the negative group Gr2A includes a negative meniscus lens that is concave on the image side, and the positive group Gr2B includes a cemented lens comprised of a biconvex positive lens and a biconcave negative lens. In the third group Gr3, the positive lens group Gr3A includes two biconvex positive lenses; the negative lens group Gr3B includes a biconcave negative lens and a positive meniscus lens that is convex on the object side; the positive lens group Gr3C includes two biconvex positive lenses; and the diaphragm ST is positioned on the object side of the third group Gr3. The fourth group Gr4 includes a positive meniscus lens that is convex on the image side and a biconcave negative lens.

The groups in the tenth embodiment (FIG. 10) are configured as follows in the order from the object side: The first group Gr1 includes one cemented lens comprised of a negative meniscus lens that is concave on the image side and a positive meniscus lens that is convex on the object side. In the second group Gr2, the negative group Gr2A includes a negative meniscus lens that is concave on the image side, and the positive group Gr2B includes a cemented lens comprised of a biconvex positive lens and a biconcave negative lens. In the third group Gr3, the positive lens group Gr3A includes a biconvex positive lens and a positive meniscus lens that is convex on the object side; the negative lens group Gr3B includes a biconcave negative lens and a positive meniscus lens that is convex on the object side; the positive lens group Gr3C includes a biconvex positive lens and a positive meniscus lens that is convex on the image side; and the diaphragm ST is positioned on the object side of the third group Gr3. The fourth group Gr4 includes a positive meniscus lens that is convex on the image side and a biconcave negative lens.

The groups in the eleventh embodiment (FIG. 11) are configured as follows in the order from the object side: The first group Gr1 includes one cemented lens comprised of a negative meniscus lens that is concave on the image side and a positive meniscus lens that is convex on the object side. In the second group Gr2, the negative group Gr2A includes a negative meniscus lens that is concave on the image side, and the positive group Gr2B includes a cemented lens comprised of a biconvex positive lens and a biconcave negative lens. In the third group Gr3, the positive lens group Gr3A includes two biconvex positive lenses; the negative lens group Gr3B includes one cemented lens of a biconcave negative lens and a negative meniscus lens that is concave on the image side; the positive lens group Gr3C includes a positive meniscus lens that is convex on the image side and a biconvex positive lens; and the diaphragm ST is positioned on the object side of the third group Gr3. The fourth group Gr4 includes a positive meniscus lens that is convex on the image side and a biconcave negative lens.

EXAMPLES

The configurations and so forth of zoom lenses to which embodiments of the present invention are applied are described below further specifically with reference to, for example, construction data of Examples. Examples 1 to 11 (EX1 to EX11) illustrated herein are numerical examples corresponding to the foregoing first to eleventh embodiments, respectively, and the optical composition diagrams (FIGS. 1 to 11) representing the first to eleventh embodiments depict, for example, the lens arrangements and the lens shape optical paths of the corresponding Examples 1 to 11.

In the construction data of Examples, surface number i, radius of curvature r (mm), on-axis surface spacing d (mm), refractive index nd with respect to d-line (wavelength of 587.56 nm), Abbe number vd with respect to d-line, and t/y'max (t: inter-lens spacing; y'max: maximum image height) are presented as surface data sequentially from the left column. Zoom ratio (variable magnification ratio) is presented as various data; for the focal distance states W, M, and T, focal distance of the whole system (Fl, mm), F-number (Fno.), half field angle (ω, °), image height (y'max, mm), lens full length (TL, mm), back focal distance (BF, mm), and variable surface spacing (di, i: surface number, mm) are presented; the respective focal distances of the lens groups Gr1, Gr2, Gr3, and Gr4 (f1, f2, f3, f4; mm) are presented as zoom lens group data. It is to be noted that regarding back focal distance BF, the distance from the last optical surface of the system to the paraxial image plane is indicated by the air conversion length; and lens full length TL is the distance from the front optical surface to the last optical surface of the system added with back focal distance BF. Further, TABLE 1 shows corresponding values of the conditional equations with respect to each Example, and TABLE 2 shows focal distances of sub-groups of the second group Gr2 and the third group Gr3 (the negative group Gr2A and the positive group Gr2B; the positive lens group Gr3A, the negative lens group Gr3B, and the positive lens group Gr3C) with respect to each Example.

FIGS. 12A to 22I are aberration diagrams (longitudinal aberration diagrams in the focused state at the infinity) corresponding to Examples 1 to 11 (EX1 to EX11), respectively; FIGS. 12A to 12C, 13A to 13C, 14A to 14C, 15A to 15C, 16A to 16C, 17A to 17C, 18A to 18C, 19A to 19C, 20A to 20C, 21A to 21C, and 22A to 22C indicate various types of aberration at the wide-angle end W, FIGS. 12D to 12F, 13D to 13F, 14D to 14F, 15D to 15F, 16D to 16F, 17D to 17F, 18D to 18F, 19D to 19F, 20D to 20F, 21D to 21F, and 22D to 22F indicate various types of aberration in the middle focal distance state M, and FIGS. 12G to 12I, 13G to 13I, 14G to 14I, 15G to 15I, 16G to 16I, 17G to 17I, 18G to 18I, 19G to 19I, 20G to 20I, 21G to 21I, and 22G to 22I indicate various types of aberration at the telephoto end T. In FIGS. 12A to 22I, FIGS. 12A, 12D, and 12G, FIGS. 13A, 13D, and 13G, FIGS. 14A, 14D, and 14G, FIGS. 15A, 15D, and 15G, FIGS. 16A, 16D, and 16G, FIGS. 17A, 17D, and 17G, FIGS. 18A, 18D, and 18G, FIGS. 19A, 19D, and 19G, FIGS. 20A, 20D, and 20G, FIGS. 21A, 21D, and 21G, and FIGS. 22A, 22D, and 22G are spherical aberration diagrams, FIGS. 12B, 12E, and 12H, FIGS. 13B, 13E, and 13H, FIGS. 14B, 14E, and 14H, FIGS. 15B, 15E, and 15H, FIGS. 16B, 16E, and 16H, FIGS. 17B, 17E, and 17H, FIGS. 18B, 18E, and 18H, FIGS. 19B, 19E, and 19H, FIGS. 20B, 20E, and 20H, FIGS. 21B, 21E, and 21H, and FIGS. 22B, 22E, and 22H are astigmatism diagrams, and FIGS. 12C, 12F, and 12I, FIGS. 13C, 13F, and 13I, FIGS. 14C, 14F, and 14I, FIGS. 15C, 15F, and 15I, FIGS. 16C, 16F, and 16I, FIGS. 17C, 17F, and 17I, FIGS. 18C, 18F, and 18I, FIGS. 19C, 19F, and 19I, FIGS. 20C, 20F, and 20I, FIGS. 21C, 21F, and 21I, and FIGS. 22C, 22F, and 22I are distortion aberration diagrams.

The spherical aberration diagrams represent the amount of spherical aberration with respect to d-line (wavelength of 587.56 nm) indicated by the solid line, the amount of spherical aberration with respect to c-line (wavelength of 656.28 nm) indicated by the alternate long and short dash line, and the amount of spherical aberration with respect to g-line (wavelength of 435.84 nm) indicated by the broken line, by way of the amount of displacement from the paraxial image plane in the direction of optical axis AX (unit: mm). The vertical axis represents the value given by standardizing the incident height to the pupil by the maximum height, i.e., the relative pupil height. In the astigmatism diagrams, the broken line T indicates the tangential surface with respect to d-line, and the solid line S indicates the sagittal surface with respect to d-line, by way of the amount of displacement (unit: mm) from the paraxial image plane in the direction of optical axis AX, and the vertical axis indicates the image height (IMG HT, unit: mm). In the distortion aberration diagrams, the horizontal axis indicates the distortion with respect to d-line (unit: %), and the vertical axis indicates the image height (IMG HT, unit: mm). It is to be noted that the maximum value of the image height IMG HT, i.e., the maximum image height y'max, corresponds to half the diagonal length of the photoreceiving surface SS of the image sensor SR, i.e., the diagonal image height.

Example 1

Unit: mm

Surface data

| i | r | d | nd | vd | t/y'max |
|---|---|---|---|---|---|
| object | infinity | infinity | | | |
| 1 | 52.594 | 2.000 | 1.91082 | 35.25 | |
| 2 | 38.917 | 8.000 | 1.48749 | 70.44 | |
| 3 | 3987.708 | variable | | | |
| 4 | 114.892 | 1.800 | 1.83481 | 42.72 | |
| 5 | 24.059 | 8.256 | | | 0.581 |
| 6 | 30.650 | 5.920 | 1.75211 | 25.05 | |
| 7 | −239.193 | 1.500 | 1.90366 | 31.31 | |
| 8 | 66.130 | variable | | | |
| 9 (stop) | infinity | 1.500 | | | |
| 10 | 55.226 | 2.684 | 1.49700 | 81.61 | |
| 11 | −73.572 | 0.500 | | | 0.035 |
| 12 | 28.604 | 2.398 | 1.48749 | 70.44 | |
| 13 | 90.512 | 5.675 | | | 0.400 |
| 14 | −38.120 | 1.200 | 1.75520 | 27.53 | |
| 15 | 39.367 | 6.496 | | | 0.457 |
| 16 | −129.595 | 2.319 | 1.83481 | 42.72 | |
| 17 | −33.266 | 0.500 | | | 0.035 |
| 18 | 56.051 | 2.822 | 1.49700 | 81.61 | |
| 19 | −52.149 | variable | | | |
| 20 | −56.079 | 2.559 | 1.59270 | 35.45 | |
| 21 | −25.922 | 4.884 | | | 0.344 |
| 22 | −21.437 | 1.000 | 1.69680 | 55.46 | |
| 23 | 175.162 | variable | | | |
| image | infinity | | | | |

-continued

Unit: mm

Various data
zoom ratio 2.34

| | Wide Angle (W) | Middle (M) | Telephoto (T) |
|---|---|---|---|
| Fl | 56.291 | 82.189 | 131.888 |
| Fno. | 3.600 | 5.000 | 5.700 |
| ω | 14.158 | 9.802 | 6.145 |
| y'max | 14.200 | 14.200 | 14.200 |
| TL | 126.570 | 147.320 | 171.425 |
| BF | 19.998 | 29.428 | 45.204 |
| d3 | 11.368 | 34.676 | 58.494 |
| d8 | 17.164 | 10.996 | 3.714 |
| d19 | 16.028 | 10.208 | 2.000 |
| d23 | 19.998 | 29.428 | 45.204 |

Zoom lens group data

| Group (Surface) | Focal Distance |
|---|---|
| 1 (1-3) | 153.340 |
| 2 (4-8) | −68.640 |
| 3 (9-19) | 38.128 |
| 4 (20-23) | −45.045 |

Example 2

Unit: mm

Surface data

| i | r | d | nd | vd | t/y'max |
|---|---|---|---|---|---|
| object | infinity | infinity | | | |
| 1 | 54.338 | 0.800 | 1.91082 | 35.25 | |
| 2 | 41.692 | 6.141 | 1.48749 | 70.44 | |
| 3 | 326.381 | variable | | | |
| 4 | 76.160 | 8.000 | 1.83481 | 42.72 | |
| 5 | 23.754 | 6.290 | | | 0.443 |
| 6 | 24.330 | 5.021 | 1.71736 | 29.50 | |
| 7 | −46.443 | 0.750 | 1.91082 | 35.25 | |
| 8 | 44.274 | variable | | | |
| 9 (stop) | infinity | 0.500 | | | |
| 10 | 51.945 | 2.860 | 1.61800 | 63.39 | |
| 11 | −57.434 | 0.500 | | | 0.035 |
| 12 | 24.363 | 2.915 | 1.49700 | 81.61 | |
| 13 | 1218.203 | 2.805 | | | 0.198 |
| 14 | −35.047 | 3.000 | 1.80610 | 33.27 | |
| 15 | 22.929 | 0.500 | | | 0.035 |
| 16 | 20.232 | 2.065 | 1.75211 | 25.05 | |
| 17 | 23.858 | 4.414 | | | 0.311 |
| 18 | 280.602 | 2.432 | 1.56883 | 56.04 | |
| 19 | −33.764 | 0.500 | | | 0.035 |
| 20 | 111.142 | 2.710 | 1.49700 | 81.61 | |
| 21 | −29.808 | variable | | | |
| 22 | −31.037 | 1.500 | 1.84666 | 23.78 | |
| 23 | −25.072 | 8.535 | | | 0.601 |
| 24 | −20.378 | 1.500 | 1.69680 | 55.46 | |
| 25 | 163.742 | variable | | | |
| image | infinity | | | | |

Various data
zoom ratio 2.35

| | Wide Angle (W) | Middle (M) | Telephoto (T) |
|---|---|---|---|
| Fl | 56.220 | 81.350 | 131.864 |
| Fno. | 3.600 | 5.000 | 5.700 |
| ω | 14.175 | 9.901 | 6.146 |
| y'max | 14.200 | 14.200 | 14.200 |
| TL | 126.554 | 146.014 | 171.395 |
| BF | 18.274 | 24.437 | 35.429 |
| d3 | 12.534 | 37.460 | 66.355 |

-continued

Unit: mm

| | | | |
|---|---|---|---|
| d8 | 22.609 | 13.615 | 3.874 |
| d21 | 9.400 | 6.766 | 2.000 |
| d25 | 18.274 | 24.437 | 35.429 |

Zoom lens group data

| Group (Surface) | Focal Distance |
|---|---|
| 1 (1-3) | 190.927 |
| 2 (4-8) | −60.371 |
| 3 (9-21) | 33.463 |
| 4 (22-25) | −33.575 |

Example 3

Unit: mm

Surface data

| i | r | d | nd | vd | t/y'max |
|---|---|---|---|---|---|
| object | infinity | infinity | | | |
| 1 | 81.789 | 0.800 | 1.91082 | 35.25 | |
| 2 | 54.987 | 5.249 | 1.59282 | 68.62 | |
| 3 | 1823.892 | variable | | | |
| 4 | 67.524 | 4.000 | 1.88100 | 40.14 | |
| 5 | 24.159 | 5.572 | | | 0.392 |
| 6 | 25.059 | 6.296 | 1.71736 | 29.50 | |
| 7 | −47.307 | 0.800 | 1.91082 | 35.25 | |
| 8 | 49.645 | variable | | | |
| 9 (stop) | infinity | 0.500 | | | 0.035 |
| 10 | 40.953 | 2.799 | 1.61800 | 63.39 | |
| 11 | −93.443 | 0.500 | | | 0.035 |
| 12 | 23.973 | 2.886 | 1.49700 | 81.61 | |
| 13 | 484.941 | 2.843 | | | 0.200 |
| 14 | −34.451 | 1.000 | 1.91082 | 35.25 | |
| 15 | 24.535 | 0.500 | | | 0.035 |
| 16 | 19.593 | 3.000 | 1.59270 | 35.45 | |
| 17 | 22.979 | 3.627 | | | 0.255 |
| 18 | 89.392 | 2.995 | 1.56883 | 56.04 | |
| 19 | −26.384 | 0.500 | | | 0.035 |
| 20 | 80.806 | 2.594 | 1.49700 | 81.61 | |
| 21 | −38.634 | variable | | | |
| 22 | −47.419 | 2.000 | 1.84666 | 23.78 | |
| 23 | −30.030 | 7.964 | | | 0.561 |
| 24 | −20.001 | 1.500 | 1.80420 | 46.50 | |
| 25 | 83.863 | variable | | | |
| image | infinity | | | | |

Various data
zoom ratio 2.38

| | Wide Angle (W) | Middle (M) | Telephoto (T) |
|---|---|---|---|
| Fl | 55.292 | 81.144 | 131.839 |
| Fno. | 3.600 | 5.000 | 5.700 |
| ω | 14.403 | 9.926 | 6.147 |
| y'max | 14.200 | 14.200 | 14.200 |
| TL | 126.573 | 148.861 | 171.374 |
| BF | 18.673 | 24.288 | 34.650 |
| d3 | 15.082 | 43.710 | 71.894 |
| d8 | 25.843 | 16.261 | 4.103 |
| d21 | 9.049 | 6.677 | 2.802 |
| d25 | 18.673 | 24.288 | 34.650 |

Zoom lens group data

| Group (Surface) | Focal Distance |
|---|---|
| 1 (1-3) | 197.538 |
| 2 (4-8) | −67.386 |

-continued

Unit: mm

| | |
|---|---|
| 3 (9-21) | 32.684 |
| 4 (22-25) | −27.955 |

Example 4

Unit: mm

Surface data

| i | r | d | nd | vd | t/y'max |
|---|---|---|---|---|---|
| object | infinity | infinity | | | |
| 1 | 86.267 | 0.800 | 1.91082 | 35.25 | |
| 2 | 57.555 | 5.943 | 1.59282 | 68.62 | |
| 3 | 3533.975 | variable | | | |
| 4 | 101.769 | 2.864 | 1.88100 | 40.14 | |
| 5 | 25.667 | 3.445 | | | 0.243 |
| 6 | 26.780 | 5.906 | 1.71736 | 29.50 | |
| 7 | −47.864 | 0.800 | 1.91082 | 35.25 | |
| 8 | 70.765 | variable | | | |
| 9 (stop) | infinity | 0.500 | | | 0.035 |
| 10 | 41.891 | 2.767 | 1.61800 | 63.39 | |
| 11 | −112.549 | 0.500 | | | 0.035 |
| 12 | 24.470 | 2.936 | 1.49700 | 81.61 | |
| 13 | 259.464 | 2.913 | | | 0.205 |
| 14 | −41.000 | 2.211 | 1.91082 | 35.25 | |
| 15 | 29.191 | 0.500 | | | 0.035 |
| 16 | 22.454 | 3.000 | 1.59270 | 35.45 | |
| 17 | 24.912 | 3.262 | | | 0.230 |
| 18 | 411.011 | 3.010 | 1.56883 | 56.04 | |
| 19 | −28.246 | 0.500 | | | 0.035 |
| 20 | 49.984 | 3.280 | 1.49700 | 81.61 | |
| 21 | −44.137 | variable | | | |
| 22 | −47.018 | 2.111 | 1.84666 | 23.78 | |
| 23 | −28.709 | 6.953 | | | 0.490 |
| 24 | −19.799 | 1.879 | 1.80420 | 46.50 | |
| 25 | 80.619 | variable | | | |
| image | infinity | | | | |

Various data
zoom ratio 2.91

| | Wide Angle (W) | Middle (M) | Telephoto (T) |
|---|---|---|---|
| Fl | 45.258 | 81.615 | 131.828 |
| Fno. | 3.600 | 5.000 | 5.700 |
| ω | 17.419 | 9.870 | 6.148 |
| y'max | 14.200 | 14.200 | 14.200 |
| TL | 126.607 | 157.909 | 171.372 |
| BF | 18.001 | 24.120 | 34.873 |
| d3 | 2.000 | 50.168 | 73.242 |
| d8 | 41.457 | 20.803 | 3.686 |
| d21 | 9.067 | 6.737 | 3.491 |
| d25 | 18.001 | 24.120 | 34.873 |

Zoom lens group data

| Group (Surface) | Focal Distance |
|---|---|
| 1 (1-3) | 204.346 |
| 2 (4-8) | −69.389 |
| 3 (9-21) | 33.303 |
| 4 (22-25) | −28.121 |

Example 5

Unit: mm

Surface data

| i | r | d | nd | vd | t/y'max |
|---|---|---|---|---|---|
| object | infinity | infinity | | | |
| 1 | 78.094 | 1.443 | 1.91082 | 35.25 | |
| 2 | 53.711 | 5.722 | 1.59282 | 68.62 | |
| 3 | 482.027 | variable | | | |
| 4 | 72.908 | 8.000 | 1.88100 | 40.14 | |
| 5 | 28.331 | 6.600 | | | 0.465 |
| 6 | 29.223 | 4.454 | 1.71736 | 29.50 | |
| 7 | −68.017 | 0.850 | 1.91082 | 35.25 | |
| 8 | 54.825 | variable | | | |
| 9 (stop) | infinity | 0.500 | | | |
| 10 | 41.155 | 3.050 | 1.61800 | 63.39 | |
| 11 | −82.487 | 0.500 | | | 0.035 |
| 12 | 24.926 | 2.843 | 1.49700 | 81.61 | |
| 13 | 121.090 | 3.437 | | | 0.242 |
| 14 | −46.297 | 3.000 | 1.91082 | 35.25 | |
| 15 | 25.663 | 0.500 | | | 0.035 |
| 16 | 20.843 | 3.000 | 1.59270 | 35.45 | |
| 17 | 23.850 | 4.548 | | | 0.320 |
| 18 | 2108.708 | 2.685 | 1.56883 | 56.04 | |
| 19 | −33.791 | 0.500 | | | 0.035 |
| 20 | 63.273 | 3.287 | 1.49700 | 81.61 | |
| 21 | −35.863 | variable | | | |
| 22 | −54.512 | 2.075 | 1.84666 | 23.78 | |
| 23 | −32.244 | 7.519 | | | 0.530 |
| 24 | −22.097 | 1.286 | 1.80420 | 46.50 | |
| 25 | 89.199 | variable | | | |
| image | infinity | | | | |

Various data
zoom ratio 2.34

| | Wide Angle (W) | Middle (M) | Telephoto (T) |
|---|---|---|---|
| Fl | 56.291 | 82.194 | 131.858 |
| Fno. | 3.600 | 5.000 | 5.700 |
| ω | 14.158 | 9.802 | 6.147 |
| y'max | 14.200 | 14.200 | 14.200 |
| TL | 131.566 | 150.445 | 171.391 |
| BF | 18.335 | 24.455 | 35.471 |
| d3 | 2.000 | 32.478 | 64.411 |
| d8 | 36.033 | 21.125 | 3.710 |
| d21 | 9.400 | 6.589 | 2.000 |
| d25 | 18.335 | 24.455 | 35.471 |

Zoom lens group data

| Group (Surface) | Focal Distance |
|---|---|
| 1 (1-3) | 217.327 |
| 2 (4-8) | −86.804 |
| 3 (9-21) | 37.578 |
| 4 (22-25) | −31.903 |

Example 6

Unit: mm

Surface data

| i | r | d | nd | vd | t/y'max |
|---|---|---|---|---|---|
| object | infinity | infinity | | | |
| 1 | 87.114 | 2.000 | 1.90366 | 31.31 | |
| 2 | 58.247 | 7.955 | 1.48749 | 70.44 | |
| 3 | −631.679 | 0.500 | | | 0.035 |
| 4 | 54.073 | 3.911 | 1.49700 | 81.61 | |
| 5 | 78.305 | variable | | | |
| 6 | 73.423 | 2.000 | 1.91082 | 35.25 | |
| 7 | 23.155 | 8.942 | | | 0.630 |
| 8 | 27.644 | 6.396 | 1.75211 | 25.05 | |
| 9 | −109.054 | 2.057 | | | 0.145 |
| 10 | −84.718 | 1.500 | 1.90366 | 31.31 | |
| 11 | 49.046 | variable | | | |
| 12 (stop) | infinity | 1.000 | | | |
| 13 | 34.924 | 3.293 | 1.65844 | 50.85 | |
| 14 | −112.002 | 7.423 | | | 0.523 |
| 15 | −26.188 | 1.500 | 1.75211 | 25.05 | |
| 16 | 54.970 | 2.719 | | | 0.191 |
| 17 | −161.997 | 2.967 | 1.88100 | 40.14 | |
| 18 | −29.542 | 0.500 | | | 0.035 |
| 19 | 46.941 | 3.444 | 1.48749 | 70.44 | |
| 20 | −48.949 | variable | | | |
| 21 | −71.577 | 2.259 | 1.84666 | 23.78 | |
| 22 | −30.446 | 4.243 | | | 0.299 |
| 23 | −24.432 | 1.000 | 1.91082 | 35.25 | |
| 24 | infinity | variable | | | |
| image | infinity | | | | |

Various data
zoom ratio 2.66

| | Wide Angle (W) | Middle (M) | Telephoto(T) |
|---|---|---|---|
| Fl | 50.191 | 82.201 | 133.658 |
| Fno. | 3.600 | 5.000 | 5.700 |
| ω | 15.797 | 9.801 | 6.064 |
| y'max | 14.200 | 14.200 | 14.200 |
| TL | 126.686 | 149.291 | 171.406 |
| BF | 20.104 | 31.997 | 47.573 |
| d5 | 2.000 | 29.277 | 52.923 |
| d11 | 20.257 | 11.050 | 3.293 |
| d20 | 18.718 | 11.360 | 2.010 |
| d24 | 20.104 | 31.997 | 47.573 |

Zoom lens group data

| Group (Surface) | Focal Distance |
|---|---|
| 1 (1-5) | 142.286 |
| 2 (6-11) | −53.222 |
| 3 (12-20) | 36.030 |
| 4 (21-24) | −53.066 |

Example 7

Unit: mm

Surface data

| i | r | d | nd | vd | t/y'max |
|---|---|---|---|---|---|
| object | infinity | infinity | | | |
| 1 | 112.364 | 2.000 | 1.90366 | 31.31 | |
| 2 | 68.521 | 6.960 | 1.48749 | 70.44 | |
| 3 | −396.071 | 0.500 | | | 0.035 |
| 4 | 57.744 | 4.049 | 1.48749 | 70.44 | |
| 5 | 95.514 | variable | | | |
| 6 | 133.121 | 2.958 | 1.75211 | 25.05 | |
| 7 | −259.882 | 3.671 | | | 0.259 |
| 8 | −150.203 | 2.000 | 1.91082 | 35.25 | |
| 9 | 22.922 | 3.823 | | | 0.269 |
| 10 | 26.727 | 3.075 | 1.84666 | 23.78 | |
| 11 | 53.574 | variable | | | |
| 12 (stop) | infinity | 1.000 | | | 0.070 |
| 13 | 35.433 | 3.075 | 1.74400 | 44.72 | |
| 14 | −262.568 | 9.272 | | | 0.653 |
| 15 | −26.498 | 1.500 | 1.75211 | 25.05 | |
| 16 | 50.961 | 2.736 | | | 0.193 |

-continued

Unit: mm

| | | | | | |
|---|---|---|---|---|---|
| 17 | −262.356 | 4.000 | 1.83481 | 42.72 | |
| 18 | −28.864 | 0.500 | | | 0.035 |
| 19 | 46.137 | 3.665 | 1.48749 | 70.44 | |
| 20 | −51.405 | variable | | | |
| 21 | −90.946 | 3.430 | 1.80518 | 25.46 | |
| 22 | −27.819 | 2.617 | | | 0.184 |
| 23 | −23.855 | 2.000 | 1.91082 | 35.25 | |
| 24 | 2642.274 | variable | | | |
| image | infinity | | | | |

Various data
zoom ratio 2.67

| | Wide Angle (W) | Middle (M) | Telephoto (T) |
|---|---|---|---|
| Fl | 50.066 | 82.212 | 133.704 |
| Fno. | 3.600 | 5.000 | 5.700 |
| ω | 15.835 | 9.800 | 6.062 |
| y'max | 14.200 | 14.200 | 14.200 |
| TL | 126.633 | 150.628 | 171.401 |
| BF | 20.266 | 27.657 | 38.954 |
| d5 | 2.377 | 36.573 | 65.310 |
| d11 | 22.685 | 11.093 | 2.308 |
| d20 | 18.475 | 12.475 | 2.000 |
| d24 | 20.266 | 27.657 | 38.954 |

Zoom lens group data

| Group (Surface) | Focal Distance |
|---|---|
| 1 (1-5) | 150.106 |
| 2 (6-11) | −55.563 |
| 3 (12-20) | 36.748 |
| 4 (21-24) | −60.500 |

Example 8

Unit: mm

Surface data

| i | r | d | nd | vd | t/y'max |
|---|---|---|---|---|---|
| object | infinity | infinity | | | |
| 1 | 58.099 | 3.000 | 1.90366 | 31.31 | |
| 2 | 44.172 | 5.676 | 1.48749 | 70.44 | |
| 3 | 419.930 | variable | | | |
| 4 | 167.066 | 2.880 | 1.83481 | 42.72 | |
| 5 | 24.848 | 3.573 | | | 0.252 |
| 6 | 24.577 | 5.884 | 1.71736 | 29.50 | |
| 7 | −30.391 | 0.800 | 1.91082 | 35.25 | |
| 8 | 58.724 | variable | | | |
| 9 (stop) | infinity | 0.500 | | | 0.035 |
| 10 | 50.466 | 3.073 | 1.61800 | 63.39 | |
| 11 | −44.801 | 0.500 | | | 0.035 |
| 12 | 21.456 | 2.951 | 1.49700 | 81.61 | |
| 13 | 179.022 | 2.949 | | | 0.208 |
| 14 | −33.660 | 1.000 | 1.80610 | 33.27 | |
| 15 | 17.859 | 0.500 | | | 0.035 |
| 16 | 17.279 | 2.538 | 1.75211 | 25.05 | |
| 17 | 22.223 | 2.847 | | | 0.200 |
| 18 | 95.144 | 2.693 | 1.56883 | 56.04 | |
| 19 | −29.863 | 4.544 | | | 0.320 |
| 20 | −224.787 | 2.632 | 1.49700 | 81.61 | |
| 21 | −23.612 | variable | | | |
| 22 | −32.541 | 1.500 | 1.84666 | 23.78 | |
| 23 | −25.718 | 7.867 | | | 0.554 |
| 24 | −20.162 | 1.500 | 1.56883 | 56.04 | |
| 25 | 69.014 | variable | | | |
| image | infinity | | | | |

Various data
zoom ratio 2.45

| | Wide Angle (W) | Middle (M) | Telephoto (T) |
|---|---|---|---|
| Fl | 53.735 | 81.043 | 131.835 |
| Fno. | 3.600 | 5.000 | 5.700 |
| ω | 14.803 | 9.938 | 6.148 |
| y'max | 14.200 | 14.200 | 14.200 |
| TL | 126.597 | 145.420 | 171.460 |
| BF | 18.495 | 24.705 | 35.854 |
| d3 | 18.186 | 42.849 | 70.285 |
| d8 | 21.875 | 11.712 | 3.657 |
| d21 | 8.634 | 6.747 | 2.257 |
| d25 | 18.495 | 24.705 | 35.854 |

Zoom lens group data

| Group (Surface) | Focal Distance |
|---|---|
| 1 (1-3) | 190.159 |
| 2 (4-8) | −49.764 |
| 3 (9-21) | 32.942 |
| 4 (22-25) | −36.228 |

Example 9

Unit: mm

Surface data

| i | r | d | nd | vd | t/y'max |
|---|---|---|---|---|---|
| object | infinity | infinity | | | |
| 1 | 60.186 | 3.000 | 1.90366 | 31.31 | |
| 2 | 45.423 | 7.610 | 1.48749 | 70.44 | |
| 3 | 390.006 | variable | | | |
| 4 | 157.714 | 2.261 | 1.83481 | 42.72 | |
| 5 | 22.136 | 2.130 | | | 0.150 |
| 6 | 23.154 | 6.870 | 1.71736 | 29.50 | |
| 7 | −41.845 | 0.800 | 1.90366 | 31.31 | |
| 8 | 83.087 | variable | | | |
| 9 (stop) | infinity | 0.500 | | | 0.035 |
| 10 | 38.674 | 2.901 | 1.61800 | 63.39 | |
| 11 | −85.684 | 0.500 | | | 0.035 |
| 12 | 26.542 | 2.849 | 1.49700 | 81.61 | |
| 13 | −909.204 | 2.732 | | | 0.192 |
| 14 | −35.446 | 1.000 | 1.80610 | 33.27 | |
| 15 | 21.657 | 0.500 | | | 0.035 |
| 16 | 21.149 | 4.748 | 1.75211 | 25.05 | |
| 17 | 28.777 | 2.747 | | | 0.193 |
| 18 | 228.781 | 2.390 | 1.56883 | 56.04 | |
| 19 | −35.301 | 0.500 | | | 0.035 |
| 20 | 114.574 | 2.662 | 1.48749 | 70.44 | |
| 21 | −29.803 | variable | | | |
| 22 | −26.050 | 1.500 | 1.84666 | 23.78 | |
| 23 | −21.677 | 7.589 | | | 0.534 |
| 24 | −17.518 | 1.500 | 1.56883 | 56.04 | |
| 25 | 90.196 | variable | | | |
| image | infinity | | | | |

Various data
zoom ratio 2.45

| | Wide Angle (W) | Middle (M) | Telephoto (T) |
|---|---|---|---|
| Fl | 53.749 | 80.792 | 131.803 |
| Fno. | 3.600 | 5.000 | 5.700 |
| ω | 14.799 | 9.968 | 6.149 |
| y'max | 14.200 | 14.200 | 14.200 |
| TL | 126.543 | 147.814 | 171.306 |
| BF | 18.246 | 24.330 | 35.306 |
| d3 | 13.687 | 43.272 | 72.656 |

-continued

Unit: mm

| | | | |
|---|---|---|---|
| d8 | 28.118 | 16.128 | 3.519 |
| d21 | 9.201 | 6.794 | 2.535 |
| d25 | 18.246 | 24.330 | 35.306 |

Zoom lens group data

| Group (Surface) | Focal Distance |
|---|---|
| 1 (1-3) | 204.604 |
| 2 (4-8) | −64.420 |
| 3 (9-21) | 33.036 |
| 4 (22-25) | −33.196 |

Example 10

Unit: mm

Surface data

| i | r | d | nd | vd | t/y'max |
|---|---|---|---|---|---|
| object | infinity | infinity | | | |
| 1 | 57.374 | 2.398 | 1.90366 | 31.31 | |
| 2 | 43.949 | 5.769 | 1.48749 | 70.44 | |
| 3 | 442.074 | variable | | | |
| 4 | 134.904 | 1.800 | 1.83481 | 42.72 | |
| 5 | 23.544 | 3.776 | | | 0.266 |
| 6 | 23.105 | 6.140 | 1.71736 | 29.50 | |
| 7 | −28.716 | 0.800 | 1.91082 | 35.25 | |
| 8 | 50.818 | variable | | | |
| 9 (stop) | infinity | 0.500 | | | 0.035 |
| 10 | 39.963 | 3.303 | 1.61800 | 63.39 | |
| 11 | −43.642 | 0.500 | | | 0.035 |
| 12 | 23.464 | 2.901 | 1.49700 | 81.61 | |
| 13 | 551.601 | 2.889 | | | 0.203 |
| 14 | −30.458 | 1.000 | 1.80610 | 33.27 | |
| 15 | 17.314 | 0.692 | | | 0.049 |
| 16 | 16.985 | 2.977 | 1.75211 | 25.05 | |
| 17 | 21.289 | 3.038 | | | 0.214 |
| 18 | 109.585 | 2.584 | 1.56883 | 56.04 | |
| 19 | −31.368 | 4.487 | | | 0.316 |
| 20 | −412.603 | 2.774 | 1.49700 | 81.61 | |
| 21 | −22.103 | variable | | | |
| 22 | −31.806 | 1.500 | 1.84666 | 23.78 | |
| 23 | −25.401 | 8.180 | | | 0.576 |
| 24 | −20.331 | 1.500 | 1.56883 | 56.04 | |
| 25 | 72.603 | variable | | | |
| image | infinity | | | | |

Various data
zoom ratio 2.45

| | Wide Angle (W) | Middle (M) | Telephoto (T) |
|---|---|---|---|
| Fl | 53.721 | 81.141 | 131.801 |
| Fno. | 3.600 | 5.000 | 5.700 |
| ω | 14.806 | 9.926 | 6.149 |
| y'max | 14.200 | 14.200 | 14.200 |
| TL | 126.580 | 145.505 | 171.466 |
| BF | 18.587 | 24.751 | 35.920 |
| d3 | 19.555 | 43.541 | 70.070 |
| d8 | 20.427 | 10.959 | 3.773 |
| d21 | 8.506 | 6.748 | 2.197 |
| d25 | 18.587 | 24.751 | 35.920 |

Zoom lens group data

| Group (Surface) | Focal Distance |
|---|---|
| 1 (1-3) | 184.654 |
| 2 (4-8) | −46.380 |
| 3 (9-21) | 32.983 |
| 4 (22-25) | −36.869 |

Example 11

Unit: mm

Surface data

| i | r | d | nd | vd | t/y'max |
|---|---|---|---|---|---|
| object | infinity | infinity | | | |
| 1 | 59.751 | 3.000 | 1.90366 | 31.31 | |
| 2 | 45.505 | 5.574 | 1.48749 | 70.44 | |
| 3 | 421.746 | variable | | | |
| 4 | 141.932 | 4.000 | 1.83481 | 42.72 | |
| 5 | 25.452 | 4.167 | | | 0.293 |
| 6 | 25.346 | 6.015 | 1.71736 | 29.50 | |
| 7 | −33.196 | 0.800 | 1.91082 | 35.25 | |
| 8 | 56.651 | variable | | | |
| 9 (stop) | infinity | 0.500 | | | 0.035 |
| 10 | 62.503 | 2.764 | 1.58913 | 61.25 | |
| 11 | −55.625 | 0.500 | | | 0.035 |
| 12 | 22.046 | 3.835 | 1.49700 | 81.61 | |
| 13 | −249.261 | 3.173 | | | 0.223 |
| 14 | −40.392 | 2.234 | 1.80610 | 33.27 | |
| 15 | 32.072 | 3.000 | 1.75211 | 25.05 | |
| 16 | 28.727 | 5.483 | | | 0.386 |
| 17 | −235.712 | 2.261 | 1.56883 | 56.04 | |
| 18 | −32.505 | 0.500 | | | 0.035 |
| 19 | 61.766 | 2.660 | 1.48749 | 70.44 | |
| 20 | −39.873 | variable | | | |
| 21 | −29.703 | 1.500 | 1.84666 | 23.78 | |
| 22 | −23.565 | 7.206 | | | 0.507 |
| 23 | −18.879 | 1.171 | 1.56883 | 56.04 | |
| 24 | 86.167 | variable | | | |
| image | infinity | | | | |

Various data
zoom ratio 2.45

| | Wide Angle (W) | Middle (M) | Telephoto (T) |
|---|---|---|---|
| Fl | 53.745 | 80.992 | 131.885 |
| Fno. | 3.600 | 5.000 | 5.700 |
| ω | 14.800 | 9.944 | 6.145 |
| y'max | 14.200 | 14.200 | 14.200 |
| TL | 126.585 | 144.753 | 171.488 |
| BF | 18.586 | 24.800 | 35.979 |
| d3 | 16.816 | 41.712 | 70.486 |
| d8 | 22.273 | 11.155 | 2.435 |
| d20 | 8.568 | 6.744 | 2.246 |
| d24 | 18.586 | 24.800 | 35.979 |

Zoom lens group data

| Group (Surface) | Focal Distance |
|---|---|
| 1 (1-3) | 196.288 |
| 2 (4-8) | −52.255 |
| 3 (9-20) | 33.012 |
| 4 (21-24) | −36.708 |

TABLE 1

| Corresponding value of conditional equation | (1) f2/f1 | (2) f2/y'max | (3) f1/y'max | (4) f3n/f3 | (5) f2n/f2 |
|---|---|---|---|---|---|
| Example 1 | −0.45 | −4.83 | 10.80 | −0.67 | 0.54 |
| Example 2 | −0.32 | −4.25 | 13.44 | −0.55 | 0.74 |
| Example 3 | −0.34 | −4.75 | 13.91 | −0.50 | 0.66 |
| Example 4 | −0.34 | −4.88 | 14.39 | −0.57 | 0.57 |
| Example 5 | −0.40 | −6.11 | 15.31 | −0.50 | 0.66 |
| Example 6 | −0.37 | −3.75 | 10.02 | −0.65 | — |
| Example 7 | −0.37 | −3.91 | 10.57 | −0.63 | — |
| Example 8 | −0.26 | −3.50 | 13.39 | −0.50 | 0.71 |
| Example 9 | −0.31 | −4.53 | 14.41 | −0.58 | 0.48 |
| Example 10 | −0.25 | −3.26 | 13.00 | −0.46 | 0.74 |
| Example 11 | −0.27 | −3.68 | 13.82 | −0.61 | 0.72 |

TABLE 2

| | Focal distance | | | | |
|---|---|---|---|---|---|
| | Gr2A (Negative) | Gr2B (Positive) | Gr3A (Positive) | Gr3B (Negative) | Gr3C (Positive) |
| Example 1 | −36.78 | 85.59 | 36.63 | −25.48 | 27.22 |
| Example 2 | −44.44 | 140.99 | 23.92 | −18.45 | 25.64 |
| Example 3 | −44.63 | 114.38 | 24.63 | −16.40 | 22.01 |
| Example 4 | −39.66 | 86.50 | 26.32 | −18.99 | 24.03 |
| Example 5 | −57.42 | 153.97 | 26.43 | −18.63 | 26.42 |
| Example 6 | — | — | 40.80 | −23.40 | 22.68 |
| Example 7 | — | — | 42.15 | −22.99 | 22.21 |
| Example 8 | −35.29 | 103.53 | 21.91 | −16.47 | 24.69 |
| Example 9 | −31.08 | 56.56 | 24.13 | −19.14 | 26.17 |
| Example 10 | −34.42 | 107.28 | 20.57 | −15.21 | 24.31 |
| Example 11 | −37.74 | 114.55 | 22.98 | −20.21 | 28.83 |

According to the above embodiments of the present invention, a zoom lens and an imaging optical apparatus are achieved, which zoom lens is reduced in size even with a viewing angle (2ω) at a telephoto end of less than 15° and has higher produceability while being operable with favorable optical performance in the entire zoom range. The zoom lens or the imaging optical apparatus is applicable to a digital device, e.g., a digital camera, thus adding a high-performance image input function to the digital device in a compact manner.

Although the present invention has been described and illustrated in detail, it is clearly understood that the same is by way of illustration and example only and is not to be taken by way of limitation, the scope of the present invention being interpreted by terms of the appended claims.

What is claimed is:

1. A zoom lens comprising a plurality of lens groups arranged at inter-group spacings along an optical axis between an object side and an image side, the zoom lens being configured such that magnification is varied by change of the inter-group spacings to be caused by movement of the lens groups along the optical axis, the lens groups comprising, in an order from the object side, a first group of positive power, a second group of negative power, a third group of positive power, and a fourth group of negative power, wherein for varying magnification from a wide-angle end to a telephoto end, the first group is configured to be moved toward the object side, the second group is configured to be moved toward the image side, the third group is configured to be moved toward the object side, and the fourth group is configured to be moved toward the object side, and the following conditional equations (1) to (3) are satisfied:

$$-0.63 < f2/f1 < -0.25 \quad (1);$$

$$-10 < f2/y'\text{max} < -3 \quad (2); \text{ and}$$

$$6 < f1/y'\text{max} < 20 \quad (3),$$

where
f1 represents the focal distance of the first group,
f2 represents the focal distance of the second group, and
y'max represents the maximum image height; and
where an inter-lens group spacing is an inter-lens spacing t satisfying a conditional equation (0): 0.14<t/y'max of inter-lens spacings t in the third group, the third group comprises, from the order from the object side, a positive lens group, a negative lens group, and a positive lens group, and the following conditional equation (4) is satisfied:

$$-0.7 < f3n/f3 < -0.4 \quad (4),$$

where
f3 represents the focal distance of the third group, and
f3n represents the focal distance of the negative lens group in the third group,
the positive lens group on the object side in the third group comprises lenses from, calculation of t/y'max being performed in an order from a lens having the strongest negative power in the third group toward the object side, a first lens having an inter-lens spacing t with an adjacent lens of or larger than t/y'max=0.14 up to a lens closest to the object side in the third group,
the negative lens group in the third group includes a negative lens having the strongest power in the third group, and comprises lenses from a lens that is next by one to the image side from, calculation of t/y'max being performed in the order from the negative lens toward the object side, a first lens having an inter-lens spacing t with an adjacent lens of or larger than t/y'max=0.14 up to a lens that is next by one to the object side from, calculation of t/y'max being performed in an order from the negative lens toward the image side, a first lens having an inter-lens spacing t with an adjacent lens of or larger than t/y'max=0.14, and
the positive lens group on the image side in the third group comprises lenses from, calculation of t/y'max being performed in the order from the lens having the strongest negative power in the third group toward the image side, a first lens having an inter-lens spacing t with an adjacent lens of or larger than t/y'max=0.14 up to a lens closest to the image side in the third group.

2. The zoom lens according to claim 1, wherein, for focusing from the infinity to a proximate object, the fourth group is configured to be moved toward the image side along the optical axis.

3. The zoom lens according to claim 1, wherein the fourth group has at least a positive lens and a negative lens.

4. The zoom lens according to claim 1, wherein any one of the positive lens groups in the third group has at least two positive lenses.

5. An imaging optical apparatus comprising:
the zoom lens of claim 1; and
an image sensor having a photoreceiving surface, the image sensor being configured to convert an optical image formed on the photoreceiving surface into electrical signals, wherein
the zoom lens is arranged such that an optical image of a photographing subject is adapted to be formed on the photoreceiving surface of the image sensor.

6. A digital device comprising the imaging optical apparatus of claim 5, the imaging optical apparatus providing at least one function of still image photographing or moving picture shooting of a photographing subject.

7. A zoom lens comprising a plurality of lens groups arranged at inter-group spacings along an optical axis between an object side and an image side, the zoom lens being configured such that magnification is varied by change of the inter-group spacings to be caused by movement of the lens groups along the optical axis,
the lens groups comprising, in an order from the object side, a first group of positive power, a second group of negative power, a third group of positive power, and a fourth group of negative power, wherein
for varying magnification from a wide-angle end to a telephoto end, the first group is configured to be moved toward the object side, the second group is configured to be moved toward the image side, the third group is configured to be moved toward the object side, and the fourth group is configured to be moved toward the object side, and
the following conditional equations (1) to (3) are satisfied:

$$-0.63 < f2/f1 < -0.25 \quad (1);$$

$$-10 < f2/y'max < -3 \quad (2); \text{ and}$$

$$6 < f1/y'max < 20 \quad (3),$$

where
f1 represents the focal distance of the first group,
f2 represents the focal distance of the second group, and
y'max represents the maximum image height; and
where an inter-group spacing is an inter-lens spacing t satisfying a conditional equation (0): $0.14 < t/y'max$ of inter-lens spacings t in the second group, the second group comprises, from the order from the object side, a negative group and a positive group, the positive group having at least one cemented lens.

8. The zoom lens according to claim 7, wherein the negative group of the second group comprises a negative meniscus lens having a convex surface as a surface on the object side, and the positive group of the second group comprises a lens having a convex surface as a surface on the object side and a lens having a concave surface as a surface on the image side.

9. The zoom lens according to claim 7, wherein, for focusing from the infinity to a proximate object, the fourth group is configured to be moved toward the image side along the optical axis.

10. The zoom lens according to claim 7, wherein the fourth group has at least a positive lens and a negative lens.

11. An imaging optical apparatus comprising:
the zoom lens of claim 7; and
an image sensor having a photoreceiving surface, the image sensor being configured to convert an optical image formed on the photoreceiving surface into electrical signals, wherein
the zoom lens is arranged such that an optical image of a photographing subject is adapted to be formed on the photoreceiving surface of the image sensor.

12. A digital device comprising the imaging optical apparatus of claim 11, the imaging optical apparatus providing at least one function of still image photographing or moving picture shooting of a photographing subject.

* * * * *